US008845437B2

(12) United States Patent
Lim et al.

(10) Patent No.: US 8,845,437 B2
(45) Date of Patent: Sep. 30, 2014

(54) GAMING CHALLENGES WHICH USE LEADERBOARDS THAT RANK CHALLENGE PARTICIPANTS

(75) Inventors: Shirlene Lim, Redmond, WA (US); Timothy Lee Bui, Renton, WA (US); Andrew C. Haon, Seattle, WA (US); J. Spencer King, Seattle, WA (US); Jeremiah Whitaker, Shoreline, WA (US); Michael B. Goulding, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/531,264

(22) Filed: Jun. 22, 2012

(65) Prior Publication Data

US 2013/0288788 A1 Oct. 31, 2013

Related U.S. Application Data

(60) Provisional application No. 61/640,593, filed on Apr. 30, 2012.

(51) Int. Cl.
*A63F 9/24* (2006.01)
*A63F 13/00* (2014.01)
(52) U.S. Cl.
USPC .............................................. 463/42; 463/31
(58) Field of Classification Search
USPC ................... 463/1, 16, 20, 25, 29–31, 40–42
See application file for complete search history.

(56) References Cited

U.S. PATENT DOCUMENTS

| 6,168,519 B1 * | 1/2001 | Nakagawa et al. ............... 463/4 |
| 6,524,189 B1 | 2/2003 | Rautila |
| 7,347,781 B2 | 3/2008 | Schultz |
| 2003/0228908 A1 * | 12/2003 | Caiafa et al. .................... 463/42 |
| 2004/0224741 A1 * | 11/2004 | Jen et al. .......................... 463/6 |

(Continued)

FOREIGN PATENT DOCUMENTS

EP 1 371 403 12/2003

OTHER PUBLICATIONS

Kuehn, et al., "Location and Situation Based Services for Pervasive Adventure Games", In Proceedings of 12th International Conference on Computer Modelling and Simulation, Mar. 24, 2010, pp. 485-490.

(Continued)

*Primary Examiner* — Milap Shah
(74) *Attorney, Agent, or Firm* — Andrew Sanders; Micky Minhas

(57) ABSTRACT

Disclosed herein are technologies that allow users to create, issue, accept and participate in gaming challenges. A gaming challenge involves participants playing a gaming application to improve their rank on a leaderboard associated with the application until challenge conditions are met or the challenge expires. Challenges can be time-based, objective-based, a tournament or of other type. A challenger can create a challenge by specifying a gaming application to be played, the leaderboard to be used in the challenge, challenge type, challenge duration, and additional challenge criteria. A gaming service can maintain the leaderboard and pass challenge-related notifications between participants. Participants' computing devices can send notices indicating when a challenge has been met or when a participant's relative ranking has changed. A challenger or challengee can select an avatar expression for animating an avatar when a challenge request or acceptance or decline of a challenge is presented at a computing device.

17 Claims, 19 Drawing Sheets

(56) References Cited

U.S. PATENT DOCUMENTS

| | | | |
|---|---|---|---|
| 2005/0227751 A1 | 10/2005 | Zanelli et al. | |
| 2006/0217198 A1* | 9/2006 | Johnson | 463/40 |
| 2006/0258463 A1* | 11/2006 | Cugno et al. | 463/42 |
| 2007/0120323 A1 | 5/2007 | Liu | |
| 2007/0191101 A1* | 8/2007 | Coliz et al. | 463/42 |
| 2007/0191102 A1* | 8/2007 | Coliz et al. | 463/42 |
| 2007/0265092 A1* | 11/2007 | Betteridge | 463/42 |
| 2008/0161111 A1 | 7/2008 | Schuman | |
| 2009/0036220 A1* | 2/2009 | Nagashima | 463/43 |
| 2009/0176557 A1* | 7/2009 | Hall et al. | 463/25 |
| 2009/0299833 A1* | 12/2009 | Estep et al. | 705/14.1 |
| 2010/0227669 A1* | 9/2010 | Van Luchene | 463/23 |
| 2010/0240450 A1 | 9/2010 | Vargas et al. | |
| 2011/0092282 A1* | 4/2011 | Gary | 463/31 |
| 2011/0281638 A1* | 11/2011 | Bansi et al. | 463/23 |
| 2012/0214598 A1* | 8/2012 | Newman et al. | 463/42 |
| 2013/0029765 A1* | 1/2013 | Parks et al. | 463/42 |
| 2013/0217501 A1* | 8/2013 | Bruno et al. | 463/42 |
| 2013/0288788 A1* | 10/2013 | Lim et al. | 463/31 |
| 2013/0331158 A1* | 12/2013 | Kurtz et al. | 463/6 |

OTHER PUBLICATIONS

International Search Report and Written Opinion, corresponding International Application No. PCT/US2013/037874, dated Sep. 6, 2013, 8 pages.

* cited by examiner

FIG. 7A

GAMES COLLECTION
Xbox live
☐ Game A
☐ Game B  ← 710
☐ Game C
☐ Game D
other
☐ Game E
☐ Game F  ← 720

GAMES
create challenge
game
[pick a game]
name
[_]
challenge type
[choose challenge type]

q w e r t y u i o p
a s d f g h j k l
z x c v b n m ⌫
0123 , space . ↵

CHALLENGE TYPE  730
Time
Objective
Tournament

CHALLENGE DURATION
1 day
3 days  ← 740
1 week
Custom
Date

CHOOSE A RECENT FRIEND
☐ gamertag
☐ gamertag  ← 750
☐ gamertag
☐ gamertag
Xbox LIVE friends  ← 760
contacts  ← 770

CONTACTS  780
☐ Contact Name
☐ Contact Name
☐ Contact Name
☐ Contact Name
☐ Contact Name
☐ Contact Name

706

```
{
  "leaderboards":[
    {
      "lbid":3,
      "name":"English Leaderboard_03",      } 1110
      "rating":"English DecimalColumn"
    },
    {
      "lbid":4,
      "name":"English Leaderboard_04",      } 1120
      "rating":"English TimeColumn"
    },
    {
      "lbid":6,
      "name":"English Leaderboard_06",      } 1130
      "rating":"English TimeColumn"}
  ],
  "primaryid":3,
  "titleid":4294840325
}
```

```
{
  "lbname":"Time",
  "pagingInfo":
      {"continuationToken":"2","totalItems":5},
  "rating":"duration",
  "user": null,
  "userList":
   [
     { "gamertag":"CriticalSTRo77",
       "rank":1,
       "rating":"1:23:54.04",
       "xuid":1234567890123455},
     { "gamertag":"TrueBlue402",
       "rank":2,
       "rating":"2:19:21.17",
       "xuid":1234567890123456 }
   ],
}
```

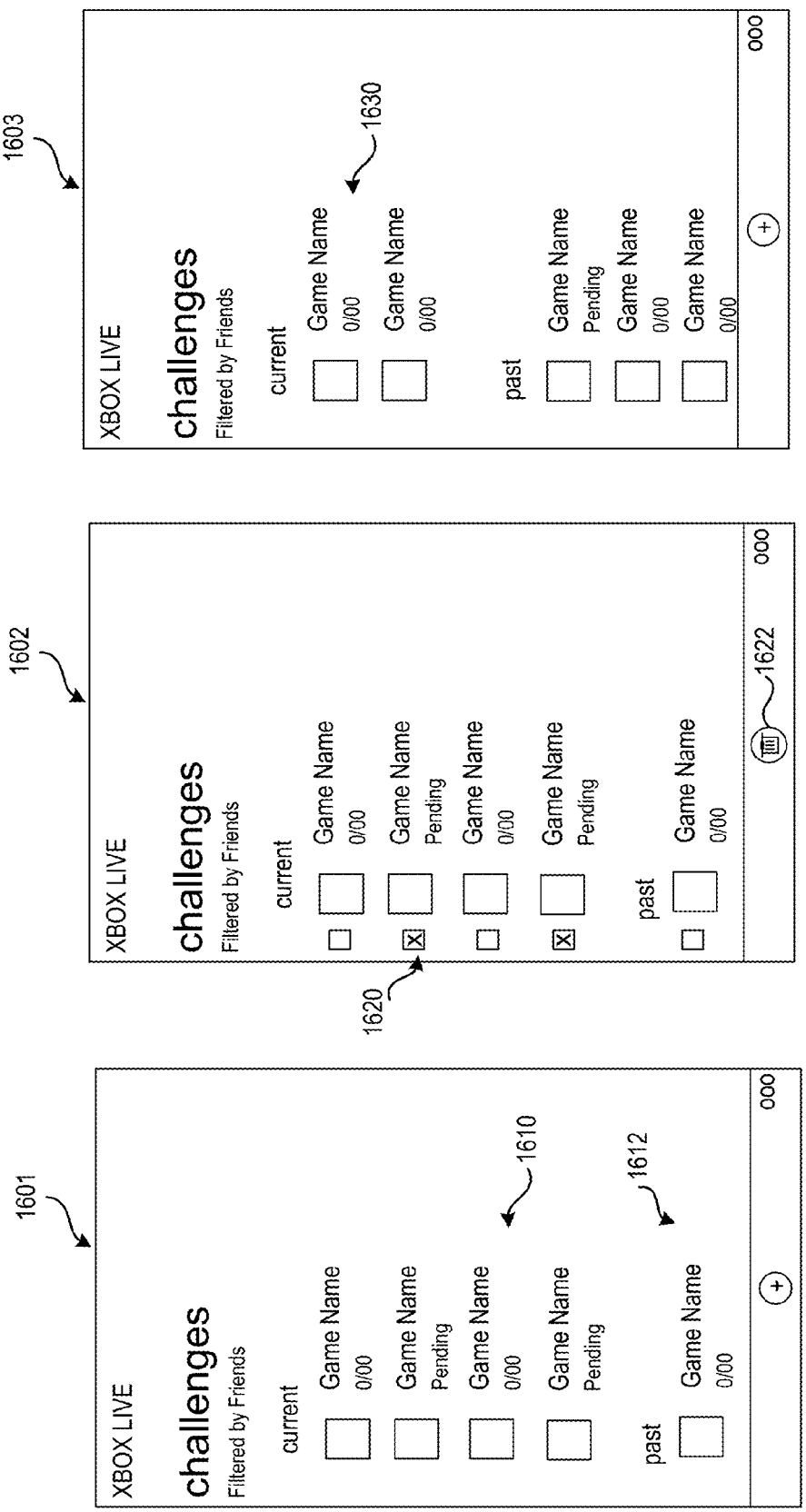

GAMING CHALLENGES WHICH USE LEADERBOARDS THAT RANK CHALLENGE PARTICIPANTS

CROSS REFERENCE TO RELATED APPLICATION

This application claims priority to, and the benefit of, U.S. Provisional Application No. 61/640,593 filed Apr. 30, 2012, which is incorporated herein by reference.

BACKGROUND

Gaming applications run on a wide variety of computing platforms, such as dedicated gaming consoles, desktop and laptop computers, social media networks and mobile devices. Users can compete against other users in various fashions, depending on the platform. For example, multiple users can simultaneously compete against others in a multi-player game if the platform has multiple gaming controllers. Alternatively, users can compete by taking turns in playing a single-player game. Internet-enabled gaming platforms allow users to measure their gaming prowess against a broader community of users by posting their scores, times, rankings or other gaming metrics to leaderboards maintained in the cloud.

SUMMARY

This Summary is provided to introduce a selection of concepts, in a simplified form, that are further described hereafter in the Detailed Description. This Summary is not intended to identify key features or essential features of the claimed subject matter nor is it intended to be used to limit the scope of the claimed subject matter.

Gaming challenge technologies are disclosed that allow users to compete against one another without requiring modifications to a gaming application, such as a single-player gaming application, that is played as part of a challenge.

In one embodiment, a challenger creates a challenge at his or her computing device, such as a smartphone, by specifying the users to invite to the challenge, the game to be played in the challenge and the leaderboard to be used in determining a challenge winner. The challenger can also specify the challenge type, the duration of the challenge, any award that is to be awarded to the challenge winner, and other criteria. In some embodiments, the challenge can be a tournament comprising individual challenges involving pairs of challenge participants.

In some embodiments, the challenger can specify an avatar expression (boastful, confident, happy, etc.), indicating how his or her avatar is to be animated when a challenge request is displayed at a challengee's computing device. Thus, avatar facial and body expressions can be selectively modified by the user to indicate a mood, feeling or emotion of the avatar. Challengees can similarly indicate expressions for their own avatars when a challenge acceptance or decline notice is presented at the challenger's computing device.

In some embodiments, the leaderboard is a cloud-based leaderboard maintained by a gaming service. The challenge participants' computing devices can receive leaderboard ranking information from the gaming service while the challenge is ongoing, display the current rankings of the challenge participants, notify other participants when there is a change in the relative rank of challenge participants, and when a challenge has ended.

The foregoing and other objects, features and advantages of the disclosed technologies will become more apparent from the following detailed description, which proceeds with reference to the accompanying figures.

BRIEF DESCRIPTION OF THE DRAWINGS

FIGS. 7A-7F show exemplary user interfaces that can be displayed at a computing device as part of creating a gaming challenge.

FIG. 11 shows exemplary leaderboard information that can be transmitted from a gaming service to a client computing device.

FIG. 13 shows exemplary leaderboard ranking information that can be transmitted from a gaming service to a client computing device.

FIG. 16 shows exemplary user interfaces for managing challenges.

DETAILED DESCRIPTION

Figure 1:
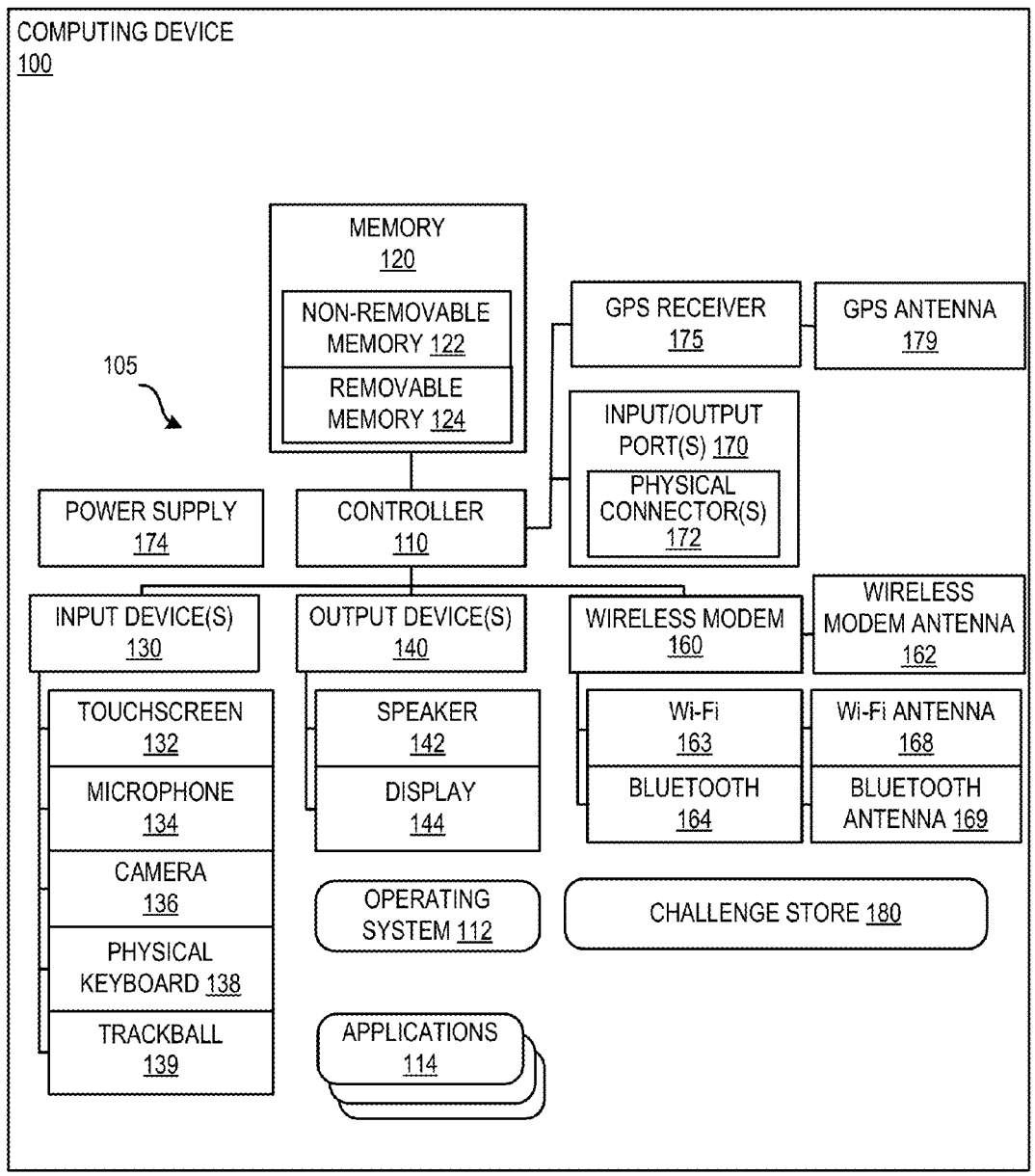
FIG. 1 is a system diagram depicting an exemplary computing device.

FIG. 1 is a system diagram depicting an exemplary computing device 100 that can be used to perform methods described herein. The computing device 100 can include a variety of optional hardware and software components 105. Generally, components 105 can communicate with other components, although not all connections are shown, for ease of illustration. The computing device 100 can be any of a variety of computing devices including mobile (e.g., cell phone, smartphone, handheld computer, laptop computer, notebook computer, tablet device, slate device, media player, handheld gaming console, Personal Digital Assistant (PDA)) and non-mobile (e.g., desktop computers, servers, gaming consoles, smart televisions) computing devices and can allow wired or wireless communication with one or more networks such as a Wi-Fi, LAN, WAN, cellular or satellite network.

The computing device 100 can include a controller or processor 110 (e.g., signal processor, graphics processing unit (GPU), microprocessor, ASIC, or other control and processing logic circuitry or software) for performing such tasks as signal coding, graphics processing, data processing, input/output processing, power control, and/or other functions.

An operating system 112 can control the allocation and usage of the components 105 and support for one or more application programs 114. The application programs 114 can include gaming applications, common mobile computing applications (e.g., email applications, calendars, contact managers, web browsers, messaging applications) as well as other computing applications.

The mobile computing device 100 can include memory 120. Memory 120 can include non-removable memory 122 and removable memory 124. The non-removable, or embedded memory, 122 can include RAM, ROM, flash memory, a hard drive, or other memory storage technologies. The removable memory 124 can include flash memory cards (e.g., SD (Secure Digital) cards), memory sticks, Subscriber Identity Module (SIM) cards, which are well known in GSM (Global System for Mobile Communication) systems, or other memory storage technologies, such as "smart cards." The memory 120 can be used for storing data and/or computer-executable instructions for running the operating system 112 and the application programs 114 on the device 100. Example data can include web pages, text, images, sound files, video data, a challenge store 180 that stores information about active and past gaming challenges, or other data sets to be sent to and/or received from one or more network servers or other devices by the mobile computing device 100 via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The computing device 100 can also have access to external memory (not shown) such as external hard drives.

The computing device 100 can support one or more input devices 130, such as a touchscreen 132, microphone 134, camera 136, physical keyboard 138 and/or trackball 139 and one or more output devices 140, such as a speaker 142, and a display 144. Other possible output devices (not shown) can include piezoelectric or other haptic output devices. Any of the input devices 130 and output devices 140 can be internal to, external to, or removably attachable with the computing device 100. External input and output devices 130 and 140 can communicate with the computing device 100 via wired or wireless connections. Some devices can serve more than one input/output function. For example, touchscreen 132 and display 144 can be combined in a single input/output device.

A wireless modem 160 can be coupled to a wireless modem antenna 162 and can support two-way communications between the mobile computing device 100 and external devices. The modem 160 and the antenna 162 are shown generically and can be a wireless cellular modem for communicating with a mobile cellular communication network. The wireless modem 160 can comprise other radio-based modems such as a Wi-Fi modem 163 or a Bluetooth modem 164, each of which can be coupled to its own antenna (e.g., Wi-Fi antenna 168, Bluetooth antenna 169). The wireless modem 160 is typically configured for communication with one or more cellular networks, such as a GSM network for data and voice communications within a single cellular network, between cellular networks, or between the mobile computing device and a public switched telephone network (PSTN).

The mobile computing device 100 can further include at least one input/output port 170 (which can be, for example, a USB port, IEEE 1394 (FireWire) port, and/or RS-232 port) comprising physical connectors 172, a power supply 174 and a satellite navigation system receiver such as a GPS receiver 175. The GPS receiver 175 can be coupled to a GPS antenna 179. The illustrated components 105 are not required or all-inclusive, as any components can be deleted and other components can be added.

Figure 2:
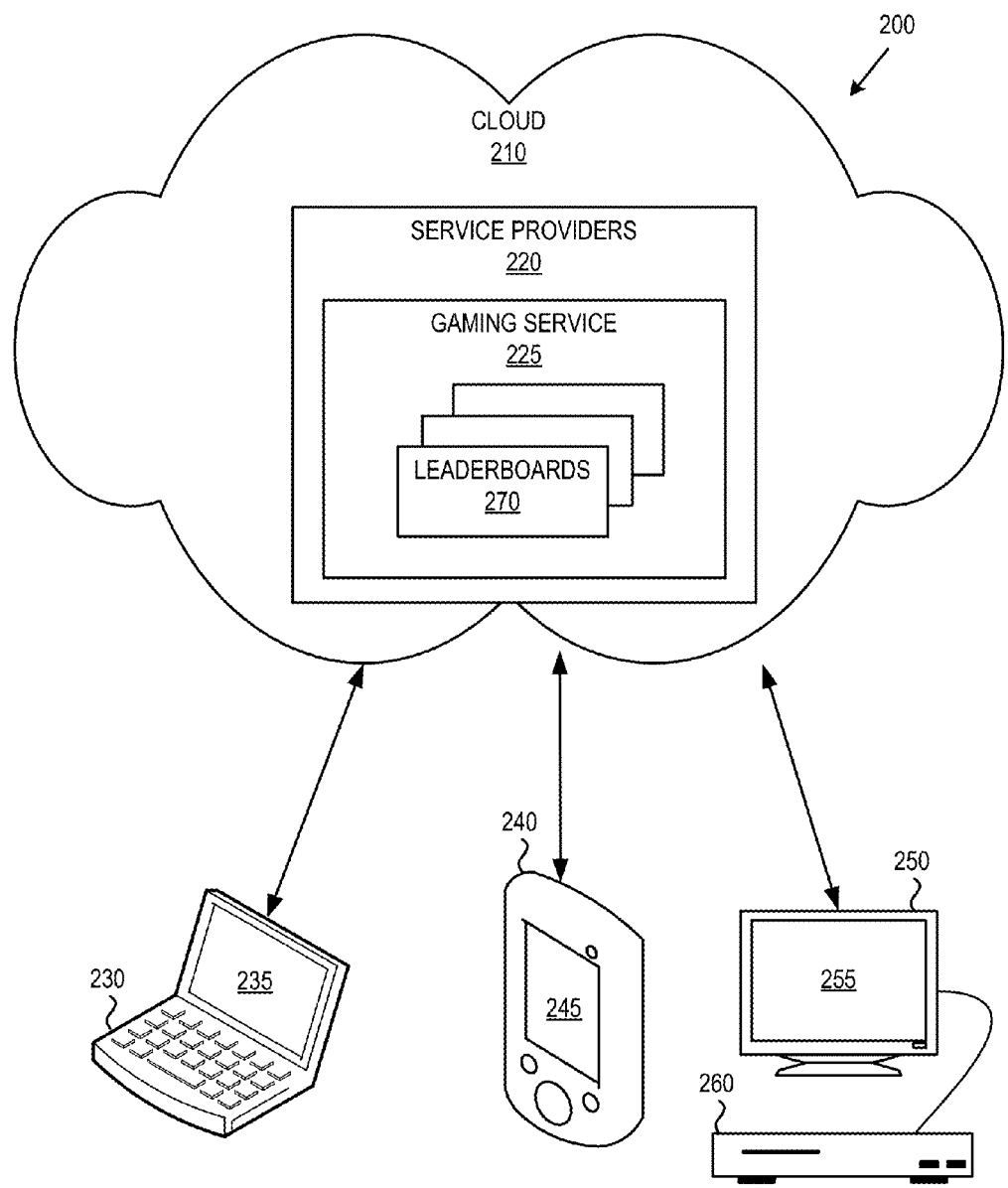
FIG. 2 illustrates a generalized example of a suitable implementation environment in which described embodiments, techniques, and technologies may be implemented.

FIG. 2 illustrates a generalized example of a suitable implementation environment 200 in which described embodiments, techniques, and technologies may be implemented.

In example environment 200, various types of services (e.g., computing services) are provided by a cloud 210. For example, the cloud 210 can comprise a collection of computing devices, which may be located centrally or distributed, that provide cloud-based services to various types of users and devices connected via a network such as the Internet. The implementation environment 200 can be used in different ways to accomplish computing tasks. For example, some tasks (e.g., processing user input and presenting a user interface) can be performed on local computing devices (e.g., connected devices 230, 240, 250) while other tasks (e.g., storage of data to be used in subsequent processing) can be performed in the cloud 210.

In example environment 200, the cloud 210 provides services for connected devices 230, 240, 250 with a variety of screen capabilities. Connected device 230 represents a device with a computer screen (e.g., a mid-size screen 235). For example, connected device 230 could be a desktop, laptop, notebook, netbook or tablet computer or the like. Connected device 240 represents a mobile computing device with a mobile computing device screen 245 (e.g., a small-size screen). For example, connected device 240 could be a mobile phone, smartphone, handheld gaming console, personal digital assistant or the like. Connected device 250 represents a device with a large screen 255. For example, connected device 250 could be a television with Internet connectivity, a television connected to another device capable of connecting to the cloud such as a set-top box or gaming console 260, a monitor connected to a desktop and server computer, or the like. Alternatively, devices without screen capabilities also can be used in example environment 200. For example, the cloud 210 can provide services for one or more computers (e.g., server computers) without displays.

Services can be provided by the cloud 210 through service providers 220, or through other providers of online services (not depicted). For example, cloud services can be customized to the screen size, display capability, and/or touchscreen capability of a particular connected device (e.g., connected devices 230, 240, 250). Services that can be provided by the service providers 220 include, for example, email, Short Message Service (SMS), Multimedia Message Service (MMS), social networking and website hosting. The service providers can host online marketplaces offering wide varieties of goods and services such as software applications and upgrades and media content which can be obtained by users with or without purchase and for download from the cloud or delivery through postal mail.

In example environment 200, the cloud 210 provides the technologies and solutions described herein to the various connected devices 230, 240, 250 using, at least in part, the service providers 220. For example, the service providers 220 can provide a centralized solution for various cloud-based services. The service providers 220 can manage service subscriptions for users and devices (e.g., for the connected devices 230, 240, 250 and their respective users).

In one embodiment, the cloud-based service providers 220 comprise a gaming service 225, such as Microsoft's Xbox LIVE® service. The gaming service 225 maintains one or more leaderboards 270 for gaming applications and is capable of passing messages or notifications between users of the gaming service. The gaming service 225 can be implemented by one or more servers. Generally, as used herein, the term "client computing device" refers to a computing device capable of communicating with the gaming service 225, such as computing devices 230, 240, 250 or 260.

The technologies disclosed herein enable users to invite other users to participate in gaming challenges that involve the playing of a gaming application. Typically, the gaming applications do not need to be modified in order to support the challenge technologies described herein. In one embodiment, gaming challenges are created, issued, received, accepted or declined, and participated in at any of the computing devices described herein. A winner of a challenge can be determined by monitoring the rank of challenge participants on a leaderboard associated with the gaming application involved in the challenge, when a challenge has expired, or when other challenge conditions have been met (e.g., a specified achievement has been unlocked).

Figure 3:
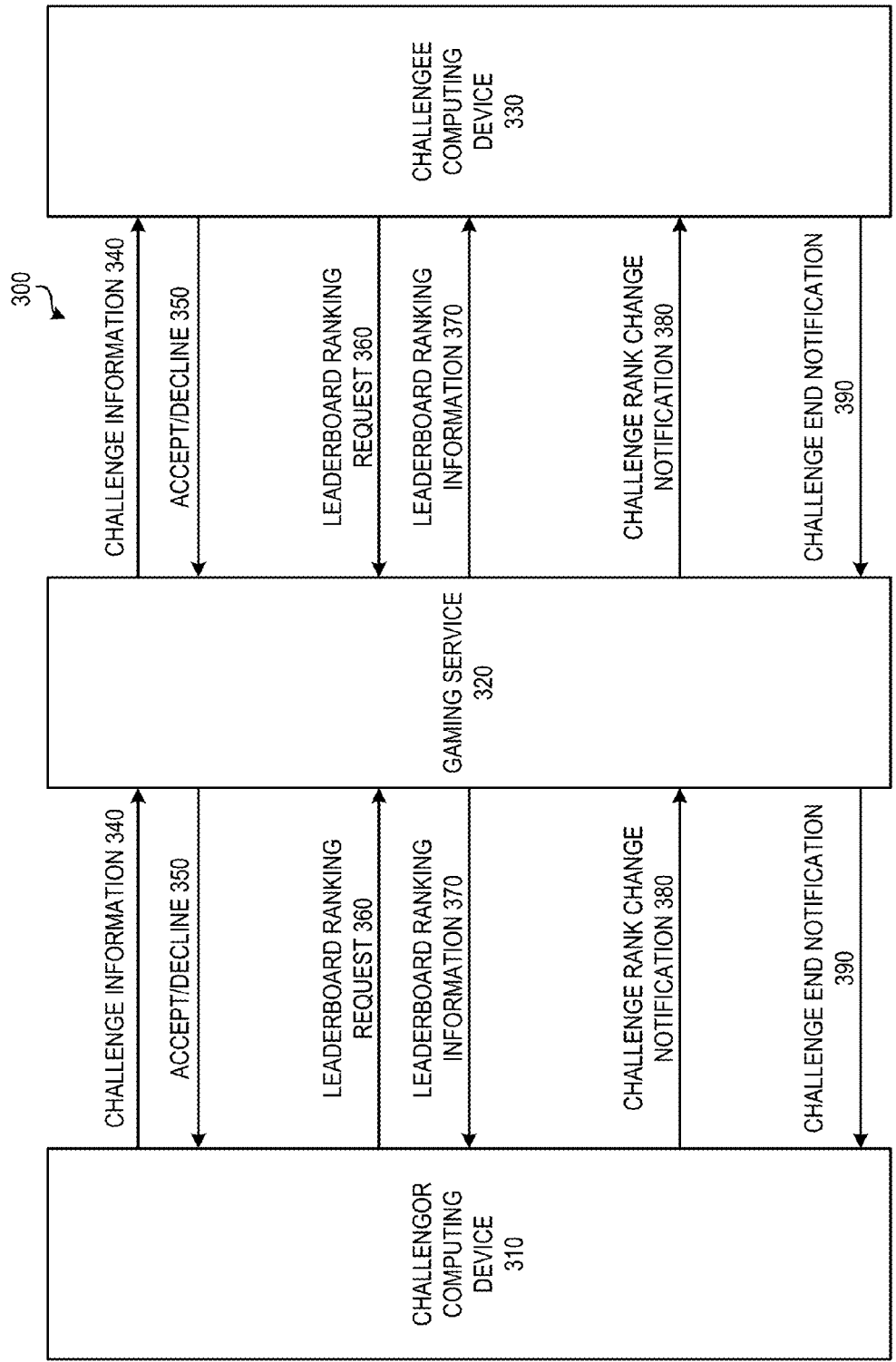
FIG. 3 shows an exemplary flow of information between a computing device operated by a challenger, a gaming service, and a computing device operated by a challengee.

FIG. 3 shows an exemplary flow of information 300 between a computing device operated by a challenger (challenger computing device) 310, a gaming service 320, and a computing device operated by a challengee (challengee computing device) 330 in a gaming challenge. The computing devices 310 and 330 can be any of the computing devices described herein.

Generally, as used herein, the term "challenger" refers to a user that creates and issues a gaming challenge and the term "challengee" refers to a user to which a challenge has been issued. Generally, as used herein, the term "challenge participants" refers to the challenger and challengees collectively. Generally, as used herein, the term "gaming challenge" refers to a challenge issued by a challenger to one or more challengees that involves playing a gaming application and that uses a leaderboard for determining a challenge winner.

A gaming challenge is created by a challenger at the challenger computing device 310. A gaming challenge can be created within the context of a gaming application or outside the content of a gaming application, such as within the context of a challenge feature of a client computing device operating system. After a gaming challenge has been created at the challenger computing device 310, challenge information 340 is transmitted from the device 310 to the gaming service 320, and relayed to the challengee computing device 330. There can be more than one challengee computing devices 330 if there is more than one challengee, and there can be more than one challengee computing device 330 for a challengee. For example, a challengee can receive a toast notification on a smartphone, a challenge invite via email on a laptop computer, and a challenge request notification on a web user interface presented on a desktop computer. Although FIG. 3 shows information being passed between the computing devices 310 and 330 via the gaming service 320 as having the same reference numbers (i.e., challenge information 340, accept/decline information 350, challenge rank change notification 380 and challenge end notification 390), the information passed between device 310 and the service 320 can vary from that passed between the service 320 and device 330 due to, for example, processing of the information or notifications added to the information by the gaming service 320.

Generally, as used herein, the term "notification" refers to a message passed between client computing devices or information contained therein. For example, a challenge request notification can refer to challenge information contained therein, and a change rank change notification can comprise challenge rank change information. The term "notification" can also refer to a notice presented at a display of a computing device. The notification can be passed between computing devices via a gaming service or passed between computing devices without the use of the gaming service. Various notifications are described herein, but, in general, the gaming service is agnostic to notification types. Processing of notifications by the gaming system is generally limited to receiving notifications, determining the recipient(s) of the notifications, and transmitting the notifications to the intended recipients.

The gaming service 320 can be a cloud-based service that stores data (e.g., leaderboards) that is used by client computing devices in determining progress of challenge participants to a challenge and/or if a challenge has been met. In some embodiments, the gaming service 320 is a cloud-based service that keeps track of leaderboards for various games that can be played at the computing devices and passes notifications such as challenge issue notifications, challenge rank change notifications and challenge end notifications, as described herein. In various embodiments, the gaming service 320 can also manage various aspects of a challenge such as creating and maintaining leaderboards specific to a certain challenge and sending leaderboard ranking information for participants of a particular gaming challenge in response to a leaderboard ranking request from a computing device. The gaming service can be a dedicated gaming service (e.g., Microsoft's Xbox LIVE® service), part of another cloud-based service, such as an online gaming environment or community (e.g., massively multiplayer online game), social media platform or the like.

Figure 4C:
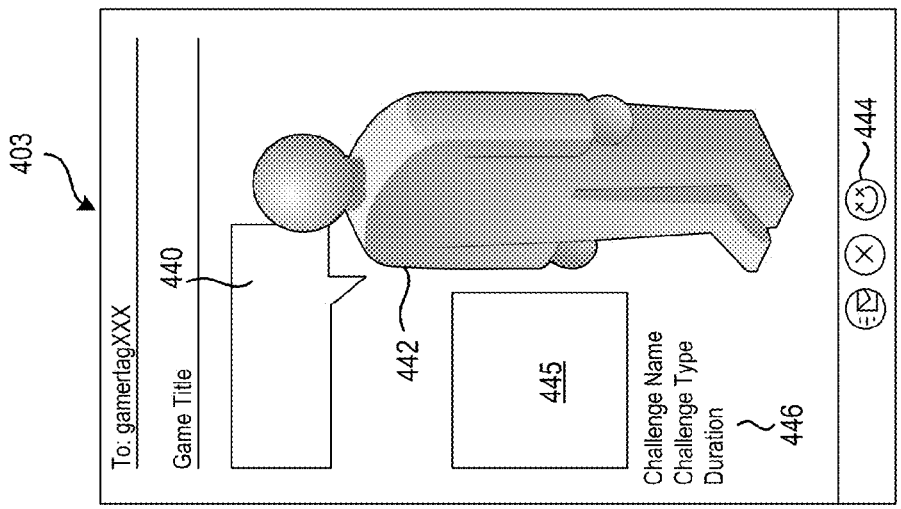
FIGS. 4A-4C shows exemplary user interfaces that can be displayed at a computing device as part of creating a gaming challenge.
Figure 4B:
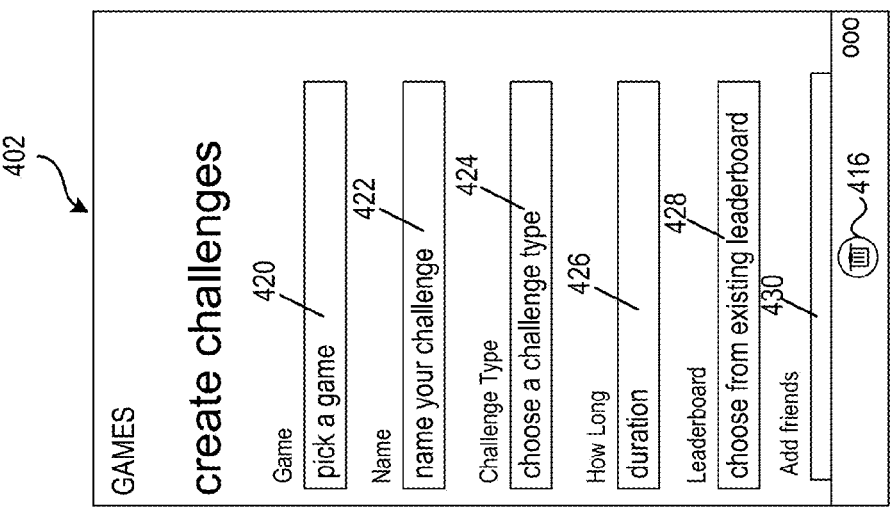
Figure 4A:
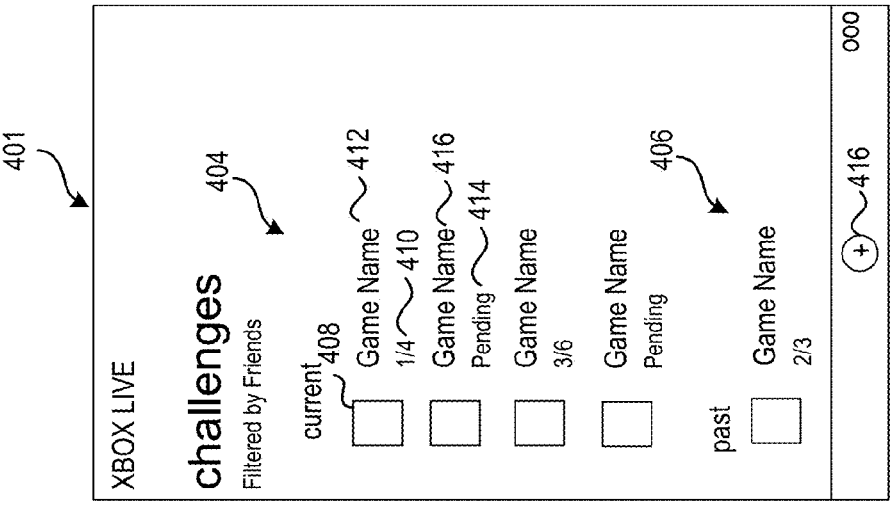

FIGS. 4A-4C show exemplary user interfaces 401-403 that can be displayed at a computing device as part of creating a gaming challenge. The user interfaces 401-403 can be displayed outside of the context of a gaming application, such as in the context of a user accessing a "challenges" feature of a smartphone operating system (e.g., by tapping a "challenges" tile or icon from a home page).

FIG. 4A shows an exemplary user interface 401 that can be displayed in response to, for example, a user navigating to a "challenges" feature of a computing device. The user interface 401 comprises a list of gaming challenges. The user interface 401 comprises a list of current or active challenges 404 and past challenges 406. The current challenges list 404 can comprise challenges that have already been accepted or declined or that have yet to be accepted or declined by a user. User interface 401 displays a game name, thumbnail image 408 and a challenge status indicator for the listed challenges. The challenge status indicator "¼" 410 for challenge 412 indicates that the user is currently ranked first out of four challenge participants. The challenge status indicator "pending" 414 does not provide any relative ranking information and indicates that the challenge 416 is in progress.

FIG. 4B shows an exemplary user interface 402 that can be displayed in response to a user selecting the create challenge button 416 in user interface 401. In user interface 402, a user can enter the gaming application to be played in the challenge in field 420 (e.g., "Extreme Motocross"), a gaming challenge name in field 422 (e.g., "Bob's Motocross Challenge"), a challenge type in field 424 ("Fastest Lap"), a duration for the gaming challenge in field 426 (e.g., "three days"), a leaderboard associated with the gaming application to be used in determining whether the gaming challenge has been met in field 428 (e.g., "Extreme Motocross—Course 1—Fastest Lap"), and one or more users that are to be invited to the challenge (i.e., the challengees for the challenge) in field 430 (e.g., "johndoe111", "johnsmith7").

The user interface 402 can comprise more or fewer fields than those shown in the display 402. For example, one or more challenge criterion fields can be included in user interface 402, such as an award field that allows a challenger to indicate an award that is to be granted to the winner of the challenge. A challenge award could be an avatar awardable. Avatar awardables include items that change an avatar's appearance (e.g., wardrobe items), provide added the avatar with added functionality or abilities (e.g., increased strength, defensive abilities, magical power) and other add-ons. Examples of avatar awardables include weapons, accessories, armor, powers, spells, equipment power-ups (e.g., for racing game—better handling tires, higher maximum speed, greater acceleration), experience points, and abilities.

Additional challenge criterion include, for example, a game difficulty setting, the level, mission, race course or quest that is to be played as part of the challenge; and the like. In some embodiments, these challenge criterion fields can appear based on values provided for various fields in user interface 402. For example, if the selected gaming application is a racing game, the user interface 402 can be refreshed upon entry of the gaming application title to show a field prompting the user to enter which racecourse is to be played.

In some embodiments, the values of one or more of the fields is the display 402 are limited to those supported by the gaming service and a user can select a value for the field from, for example, a drop-down list. For example, the computing device 310 can request from the gaming service the leaderboards that the service maintains for the gaming application entered by the user. The maintained leaderboards can then be presented in a list to the user, and the user can select from among the leaderboards presented in the list. In some embodiments, the gaming service can provide to the computing device the challenge types, levels (tracks, quests, missions, etc.), difficulty levels and the like for a gaming application. Alternatively, this information can be requested by the computing device from the gaming application executing thereon, or it can be retrieved from a challenge store stored locally at the computing device.

The gaming application provided in field 420 can be any gaming application for which a gaming service maintains a leaderboard. Typically, a gaming challenge utilizes a leaderboard maintained by the gaming service that tracks a game metric for users regardless of whether they are participating in a challenge. In some embodiments, the gaming service can create and maintain a leaderboard for a particular challenge that can be discarded by the gaming service after the challenge has ended. In some embodiments, a custom leaderboard for a particular challenge can be managed by the challenging user's computing device. The gaming application can be implemented in software, hardware or a combination thereof.

The challenge type provided in field 424 indicates a type of challenge for the challenge being created. The challenge type can be time-based, objective-based, tournament or another challenge type. Time-based challenges include, for example, the fastest lap or overall time for a racing game, or the time it takes a user to complete a level, quest, mission or the like. Time-based challenges can be an absolute time challenge (e.g., a specific time that participants are to beat in order to win the challenge) or a relative time challenge (e.g., the user having the best time when the challenge expires wins the challenge). Objective-based challenges include, for example, the first user to complete a level, defeat an opponent, collect an item, achieve a particular ranking level or beat the challenging user's current score, ranking. Objective-based challenges can be absolute (e.g., the first user to achieve the objective wins the challenge) or relative (e.g., the user that achieves the highest ranking, score, etc. by the end of the challenge wins the challenge). In some embodiments, the challenge type can be used to restrict the possible values for other fields in user interface 402 and other challenge criteria. For example, selecting "time-based" as the challenge type can cause the leaderboard to be restricted to leaderboards that keep track of time-related metrics for the selected gaming application.

In a tournament challenge, participants are paired off to compete in individual head-to-head challenges (matches) to determine a tournament winner. The individual matches within a tournament can be of any challenge type and the tournament can follow a single-, double- or triple-elimination, or any other tournament format. Initial tournament match-ups can be generated randomly, based on current leaderboard rankings (e.g., the two users having the highest current ranking are matched, the users having the next two highest rankings are paired, etc.; or, the top-ranked user is paired against the lowest ranked pair, the next-highest ranked user is paired against the next-lowest ranked user, etc.) or in other fashions.

Management of a tournament can be performed, for example, by challenger or challengee computing devices. For example, in one embodiment, a challenger computing device can manage the tournament by performing tournament tasks such as determining which pairs of users are to be paired off in the individual matches, determining winners of individual matches, and determining the tournament winner. Challengee computing devices can send information to the challenger computing device to provide information to support these tasks. In some embodiments, a gaming service can be responsible for managing at least a part of a tournament challenge.

In one example of a tournament challenge, Abe creates a single-elimination tournament challenge in which Bill, Cindy and Dave are participants. Abe creates the tournament challenge on his smartphone on April 26 at 1:00 PM. Abe's smartphone transmits the tournament request to a gaming service that creates the first round of tournament pairings randomly. The gaming service creates private leaderboards for the tournament matches. The private leaderboards can be updated only by the match participants and the match participants start with no ranking within the private leaderboard. The private leaderboard can have an expiration time (i.e., a challenge duration time for the individual matches within the tournament) after which the private leaderboard cannot be updated.

As the tournament is played, the gaming service can send challenge update notifications to tournament participants containing information from the individual challenges (e.g., leaderboard ranking information for the individual match-ups, the results of the individual matches) plus information about which participants are paired. If there is an odd number of participants, one participant can be randomly selected to receive a bye (i.e., automatically makes it to the next round of pairings and is guaranteed to be paired up in the next round).

In a tournament challenge, a user interface can be displayed showing a tournament bracket filled out to the extent that tournament matches have been completed.

Continuing with the tournament example, the results from the first round of matches can be determined, for example, 24 hours after the matches started, at 1:00 PM on April 27 (other challenge duration lengths could be chosen). The gaming service can check results at 1:00 PM on April 27 by performing the following (alternatively, matches can be checked to see if they have ended when a participant accesses the gaming application or when a player's game metric for the leaderboard is sent to the gaming service to update the leaderboard):

1. Check the private leaderboard for the current match.

2. Where the gaming service has paired up Abe vs. Bill and Cindy vs. Dave in the first round, Abe's ranking is compared to Bill's ranking, and Cindy's ranking is compared to Dave's ranking on the associated private leaderboards, and match winners are advanced to the next round. The losing users are eliminated from the tournament. The gaming service can retain private leaderboards for matches in the tournament for at least the duration of the tournament.

3. Determine pairings for the next round of the tournament, or complete the tournament if there are no rounds left.

4. Send a challenge update notification to tournament participants notifying them that the results of current round are in. For example, a challenge update notification can cause a toast notification to be presented that states "Round 1 tournament results are in!"

5. A user tapping on the toast message or the corresponding notification can cause a display to be presented with current and past results that have been generated thus far for the tournament.

Figure 17:
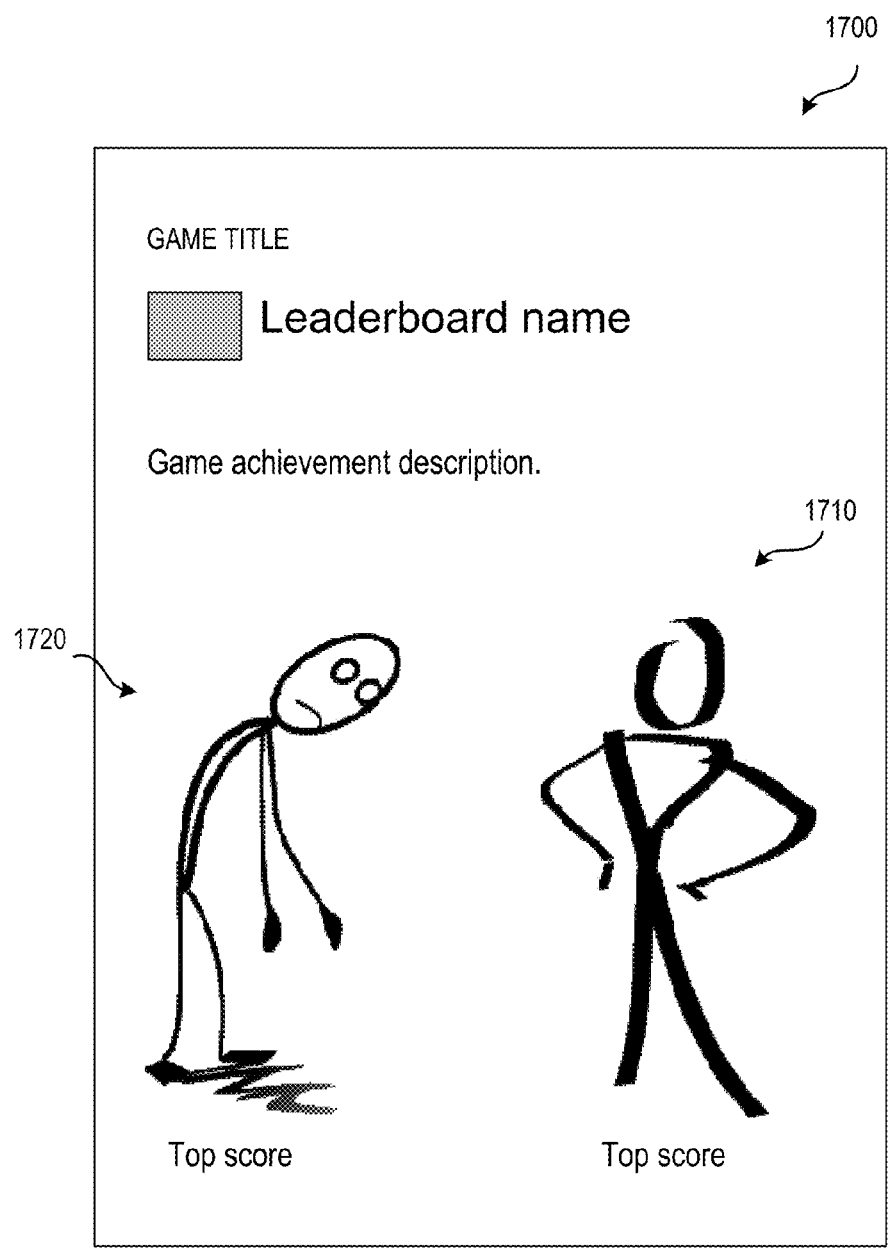
FIG. 17 shows an exemplary user interface displaying a winning user's avatar animated with a positive expression and a losing user's avatar animated with a negative expression.

6. In response to a user tapping on a particular match a display can be shown with avatars for the match participants animated according to the outcome for the match. FIG. 17 shows one such exemplary display 1700. The winning user's avatar 1710 is animated with a positive expression and a losing user's avatar 1720 is animated with a negative expression. Actions 1 through 6 can be repeated until all but one tournament participants have been eliminated.

Returning to FIG. 4B, the challenge duration provided in field 426 indicates how long a challenge is to last. The challenge can begin when a challenge request notification is transmitted from a challenger computing device; upon acceptance of the challenge by a first challengee, a specified number of challengees, or all challengees; when the game specified in the gaming application is first played by a challengee; or other event. Alternatively, the challenge duration can specify a relative date such as "this Friday", "the end of next week" or a specific date, e.g., "May 10." In some embodiments, a challenger can specify start and end times for a challenge.

The leaderboard specified in the field 428 is a leaderboard associated with the gaming application specified in field 420. A leaderboard comprises an ordered list of a plurality of users that have played the game. A particular leaderboard can be ordered according to a particular metric (game metric) associated with the gaming application. A user's rank is their position within a leaderboard. A user's rank can be absolute (i.e., their position relative to all other users in a leaderboard) or relative (i.e., their position relative to other challenge participants within a leaderboard). Various game metrics that can be tracked by a leaderboard include scores (e.g., high score for a game or a level within a game), time (e.g., fastest overall time, fastest lap time), rank, milestone or objective reached (e.g., completion of a quest, treasure collected, enemy vanquished). Separate leaderboards can be associated with individual levels, courses, quests, missions, difficulty level and the like. The leaderboards can have a "friendly name" that allows them to be easily identified by a user (e.g., "Extreme Motocross—Race Course A—Beginner"). In some embodiments, the leaderboard identified in challenge information for a challenge is an existing leaderboard already being maintained by a gaming service or other entity. In various embodiments, a custom leaderboard can be created and managed for an individual challenge. Custom leaderboards can be maintained at a challenger or challengee computing device, or by a gaming service. If custom leaderboards are created, user interface 402 can provide a field in which a challenger specifies the gaming metric the custom leaderboard is to track.

Not all of the fields shown in the user interface 402 need be specified for every challenge. For example, in some challenges, a leaderboard may not be specified. For example, in an objective-based challenge, where the challenger specifies that a particular item is to be unlocked or acquired in an additional challenge criterion field, there may not be a leaderboard maintained by a gaming service that tracks whether players having unlocked that particular item.

Challengees can be identified in field 430 with user-identifying information such as a gaming service userid or other user identification information such as an email address or phone number. For example, if the gaming service is the Xbox LIVE® service, the challenged users can be identified by their Xbox LIVE® userid.

FIG. 4C shows a user interface 403 that prompts a challenger for information during creation of a challenge. The user interface 403 comprises a challenge message window 440 in which the challenger can enter a personalized message to be included in a challenge request presented to a challenged user (e.g., "I challenge you to beat my fastest time in Extreme Motocross!"). The user interface 403 further comprises an avatar 442 of the challenger that can be animated according to an expression specified by the challenger. The avatar 442 can be an avatar that the challenger has set up through the gaming service or at the challenger computing device. Selection of an avatar expression button 444 can bring up a list of avatar expressions for the challenger to select from to indicate how the avatar is to be animated in the challenge request. These expressions can animate the avatar as being excited, tough, confident, happy, sad, frustrated or in any other manner, or indicate a gesture or action that avatar is to perform such dancing, jumping, folding arms or pointing. If no avatar expression is indicated, the avatar can be animated in a challenge request according to a default expression or not be animated at all.

In some embodiments, avatar expression information can comprise information indicating a mood, feeling, emotion or action that a computing device can use to determine how an avatar is to animated. For example, upon determining that avatar expression information indicates that an avatar is to be animated as confident, the computing device knows to animate the avatar in a sequence in which the avatar crosses its arms, puffs out its chest and stands tall. The information used by the computing device to animate an avatar in accordance with a designated expression can be stored locally at the computing device. In various embodiments, avatar expression information can comprise information on how an avatar is to be animated, without reference to a mood, feeling, emotion or action. For example, avatar expression information can comprise information indicating how an avatar is to move in a series of avatar images, such as frame model information for the avatar, indicating how the avatar is to be rendering in a series of images.

In some embodiments, the message window 440 can be pre-populated with a message based on challenge information already supplied by the user (e.g., supplied in user interface 402). One example of a pre-populated message is "I challenge you to have the higher ranking on the <leaderboardFriendlyName> leaderboard by <DateTimeNow+NDays>. My current rank is <rank> with <rating>," where <leaderboardFriendlyName> is the friendly name of the leaderboard, <DateTimeNow> is the current time, <NDays> is the duration of challenge specified in days, <rank> is the rank of the challenging user within the leaderboard, and <rating> is the current rating of the user. A pre-populated message can be edited or replaced with a custom message entered by the challenger.

In some embodiments, the message window 440 can be pre-populated with a message based on a challenge history between a challenger and a particular challengee. The pre-populated message can consider the time and/or the outcome of prior challenges between the two users. For example, if a challenger has recently lost to a challengee they are challenging again, the pre-populated message could be "Give me a chance to win back my honor!" In another example, if a challenger has won every challenge issued to challengees in a particular game (or won the most recent n challenges in a row), the message window 440 could be pre-populated with "I am unbeatable! I challenge you to try again and take my place as Rank #1 in <game> leaderboard." where <game> is the gaming application specified in the gaming challenge. Challenge history information can be stored in a challenge store stored locally at a client computing device, or centrally at a gaming service.

The user interface 403 further comprises userids of one or more challengees, the name of the gaming application, a thumbnail image 445 of the gaming application, and additional information 446 comprising the challenge name, challenge type and duration. The user interface 403 can have more or less information than that shown. In some embodiments, different avatar expressions and challenge messages can be provided for different challengees.

After the challenge has been created at the challenger's computing device 310, challenge information 340 is sent from the computing device 310 to the gaming service 320, to be forwarded onward to the challenged user's computing device 330. The challenge information 340 can be sent as part of a challenge notification. The challenge information 340 can include one or more of the following: participant information identifying the challenger and challengees, game information identifying the gaming application to be played as part of the gaming challenge, leaderboard information indicating the leaderboard associated with the gaming application to be used in determining in determining a challenge winner, a challenge message, and challenger avatar expression information.

In some embodiments, a challenge can be issued via a challenge notification that is added to a challengee's notification queue within a gaming service. In other embodiments, challenge information can be sent to a challengee via email, MMS, a social media network or in another manner.

Figure 5:
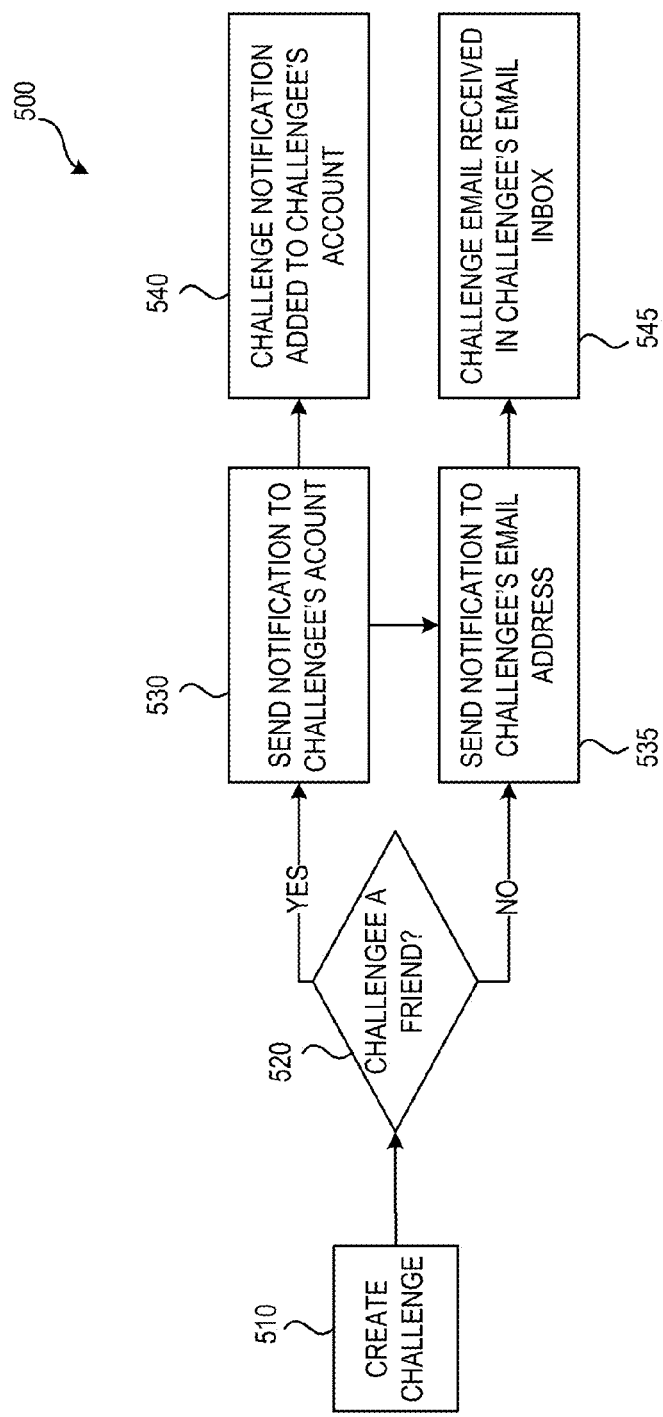
FIG. 5 is an exemplary flowchart for sending and receiving a gaming challenge.
Figure 6A:
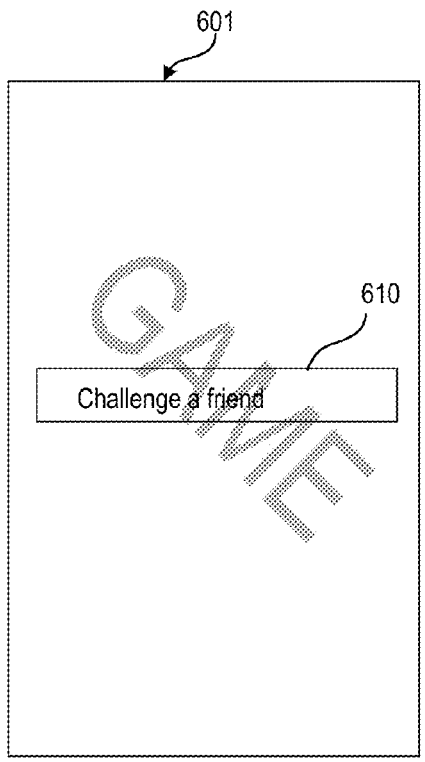
FIGS. 6A-6D show exemplary user interfaces that can be displayed at a computing device as part of creating a gaming challenge within the context of gaming application.
Figure 6B:
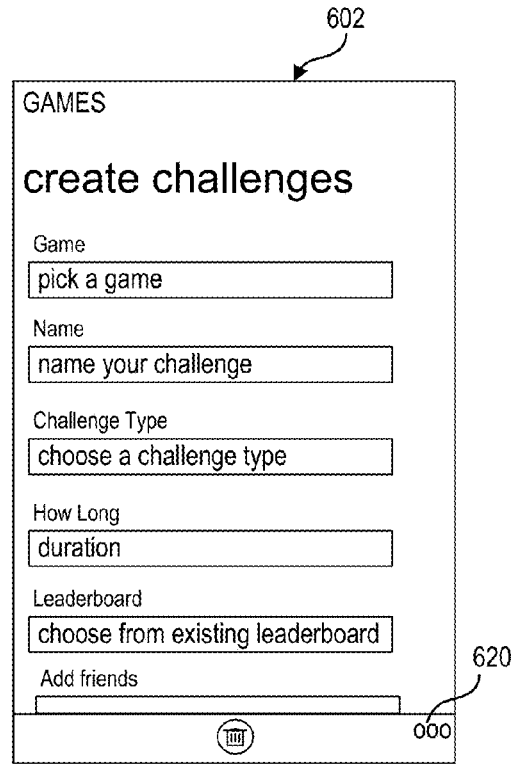
Figure 6C:
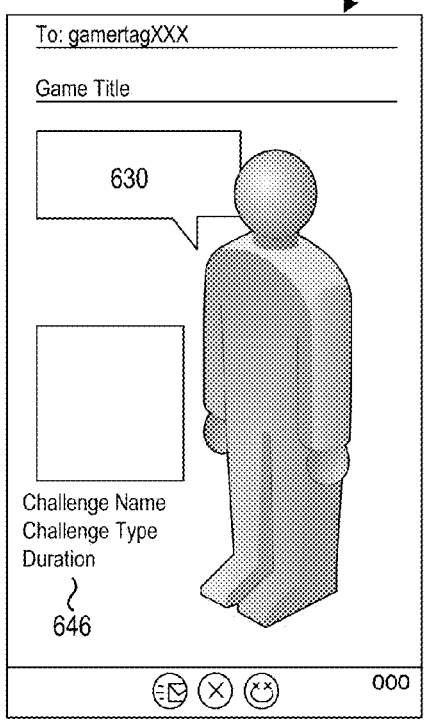
Figure 6D:
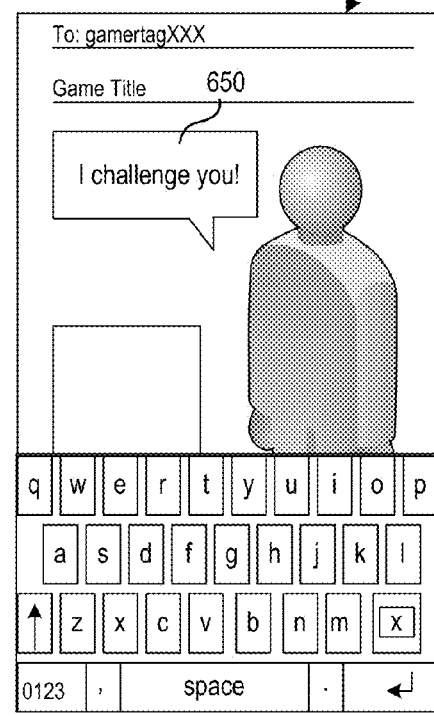

FIG. 5 is an exemplary flowchart 500 for sending and receiving a gaming challenge. At 510, a challenge is created by a challenger. At 520, it is determined, for the individual challengees, whether the challengee is a friend of the challenger within a gaming service, community, environment or the like. For example, if the gaming service is the Xbox LIVE® service, it can be determined at 520 whether a challengee is a friend of the challenger within the Xbox LIVE® service. If the challengee is a friend, at 530, a notification is sent to the challengee's account, and, at 540, a challenge notification is added to the challengee's account. Regardless of whether a particular challengee is a friend, at 535 a challenge notification is sent to the challengee's email address (or phone number (if an MMS notification is sent), social media network userid, etc.) and a challenge email is received in the challengee's email inbox at 545 (or at the challengee's smartphone if sent by MMS, or social media network messaging system inbox).

FIGS. 6A-6D show exemplary user interfaces 601-604 that can be displayed at a computing device as part of creating a gaming challenge within the context of the gaming application. User interface 601 shows a button 610 that a user can select to create a challenge involving the gaming application currently being executed on the computing device. Selecting the button 610 can cause user interface 602 to be displayed, which is similar to user interface 401, for the collection of challenge information. The game field can be auto-filled with the name of the gaming application. By advancing to user interface 603, by, for example, tapping a "next screen" button 620, a user can enter a challenge message and indicate a challenger avatar expression for the challenge request. By tapping a point on the computing device display within the challenge message window 630, an on-screen keyboard 640 (shown in user interface 604) can appear that allows a user to compose a custom challenge message 650, as shown in display 604.

FIGS. 7A-7F show exemplary user interfaces 701-706 that can be displayed at a computing device as part of creating a gaming challenge. The user interfaces 701-706 allow a user to select various gaming challenge parameters (e.g., gaming application, challenge type) instead of entering the information manually. The user interfaces 701-706 can be presented, for example, in response to one of the fields in user interface 401 in FIG. 4B or 601 in FIG. 6A being selected. For example, the user interface 701 can be displayed in response to a challenger tapping the "game" field in either user interface 401 or 601. The user interface 701 displays a list of games 710 for which the gaming service maintains at least one leaderboard, and a list of games 720 for which the gaming service does not maintain leaderboards.

FIG. 7B shows a user interface 702 in which a user can manually enter the name of a challenge. FIG. 7C shows a user interface 703 comprising a list of challenge types 730 (time, objective, tournament) from which a user can select for a new challenge. In some embodiments, selection of one of the listed challenge types can cause another user interface to be displayed in which a challenge sub-type can be selected. For example, selection of the "time" challenge type can cause a challenge sub-type user interface to be presented listing time-based challenge sub-types such as "total time," "lap time," "level time" and the like. FIG. 7D shows a user interface 704 comprising a list of challenge durations 740 that a user can select from to indicate a challenge duration. Selection of a "custom" duration can allow a user to enter a custom duration, and selecting "date" can allow a user to indicate a specific date on which the challenge ends or a start and stop date for the challenge.

FIG. 7E shows a user interface 705 in which a user can select challengees for a challenge. The user interface 705 comprises a list of recent friends (or challengees) 750 that a user can select from. Clicking on the "Xbox LIVE friends" user interface element 760 can cause an additional user interface (not shown) to be presented that allows the user to select from the user's friends with the Xbox LIVE® (or other) gaming service. Selection of the "contacts" user interface element 770 can cause the user interface 706 to be presented, which comprises a list of contacts 780 from the user's list of contacts stored locally or accessible by the computing device.

Returning to FIG. 3, after challenge information 340 has been transmitted to the challengee computing device 330, the challengee computing device 330 can cause a challenge notification to be output at a display of the device 330. In one embodiment, a temporary pop-up or toast user interface element comprising information indicating that a gaming challenge has been issued to the challenged user can be displayed. Selecting (e.g., clicking or tapping) the temporary pop-up or toast UI element can cause an interstitial page to be displayed.

Figure 8:
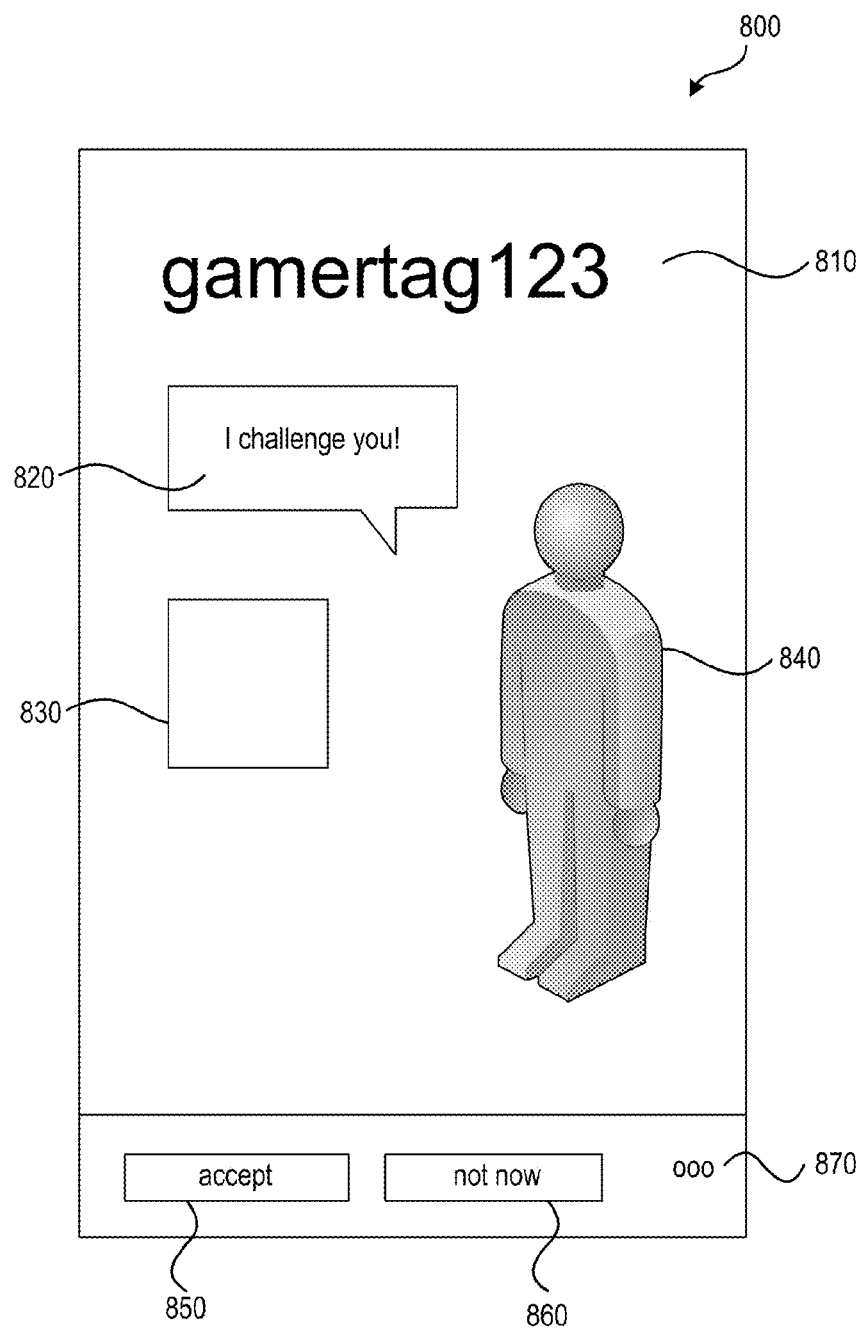
FIG. 8 shows an exemplary interstitial page that can be presented at a computing device as part of a challenge notification.

FIG. 8 shows an exemplary interstitial page 800 that can be presented at a computing device as part of presenting a challenge request. The page 800 comprises challenger participant information (e.g., challenger userid "gamertag123") 810, a challenge message 820, a thumbnail image 830 of the gaming application selected for the challenge and an avatar 840 of the challenger. The avatar 840 can be animated according to challenger avatar expression information included in the received challenged information 340. If no avatar expression was selected by the challenging user, the avatar 840 can be animated according to a default animation, or the avatar can be unanimated. The avatar can be a 2D or 3D avatar. The interstitial page 800 further comprises an "accept" button 850 for accepting the challenge, a "not now" button 860 to dismiss the notification and cause the challenge request to be presented at a later time, and a button 870 that displays additional challenge information. In some embodiments, the page 800 can comprise a "decline" button that allows a challengee to decline the challenge.

In response to a challengee accepting or declining the challenge, accept/decline information 350 can be transmitted from the challengee computing device 330 to the gaming service 320, which relays the accept/decline information 350 to the challenger computing device 310. In response to receiving the accept/decline information 350 at the device 310, an acceptance or decline notification can be presented at the device 310. In some embodiments, when accepting or declining a challenge request at the challengee computing device 330, a challengee can compose a challenge response message and select a challengee avatar expression. The challenge response message and the challengee avatar expression information can be included in the accept/decline information 350. When a challenge acceptance or decline notification is presented at the challenger computing device 310, the challenge response message is presented and a challengee avatar can be animated according to the challengee avatar expression information. After a challenge notice sent to a challengee's gaming service account has been accepted or declined, the challenge notice can be deleted from the challengee's gaming service account.

Once a challenge has begun, the current status of a challenge can be determined based on the leaderboard selected for the challenge. As challenge participants play the game associated with the challenge, their position on the leaderboard is updated as the player progresses through or otherwise plays the game. Updated game metrics for challenge participants are transmitted to the gaming service as the participants complete a portion of a game (e.g., complete a race, defeat a level boss, finish a quest), when a participant starts or exits a gaming application, on a periodic or other time basis, or at any other time.

Returning to FIG. 3, a computing device can transmit a leaderboard ranking request 360 to the gaming service 320 to update the challenge status. The leaderboard ranking request 360 can comprise leaderboard information identifying a leaderboard associated with a gaming challenge. In return, the gaming service 320 can transmit leaderboard ranking information 370 back to the requesting computing device. In some embodiments, the leaderboard ranking information 370 comprises ranking information for users in a leaderboard regardless of whether they are participants to the active challenge. In other embodiments, the leaderboard ranking information 370 comprises leaderboard ranking information only for challenge participants. In the latter case, the leaderboard request information 360 can comprise participant information identifying the challenge participants. In response to receiving the leaderboard ranking information 370, a computing device can update challenge status indicators for active challenges (e.g., indicator 410), update a locally stored challenge record corresponding to the challenge, as discussed below, and present a display indicating the relative rankings of challenge participants.

Figure 9C:
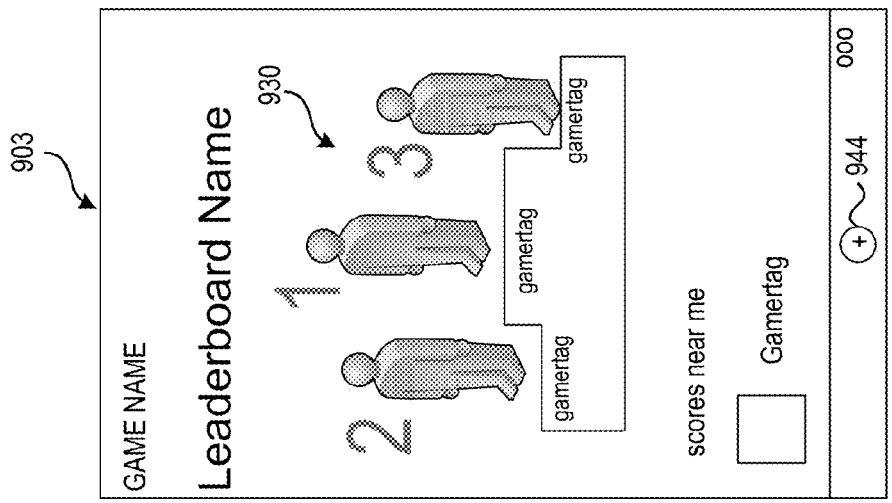
FIGS. 9A-9C show exemplary user interfaces that can be displayed at a computing device for navigating to a particular leaderboard and showing the rankings of challenge participants.
Figure 9B:
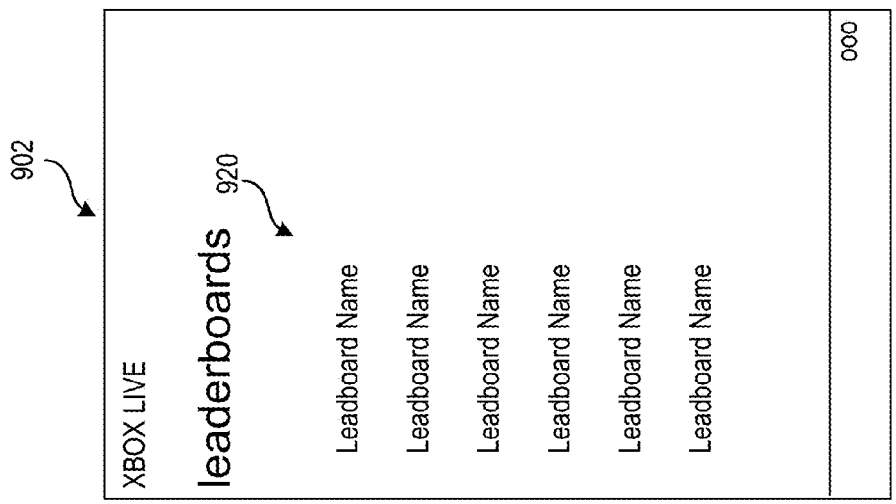
Figure 9A:
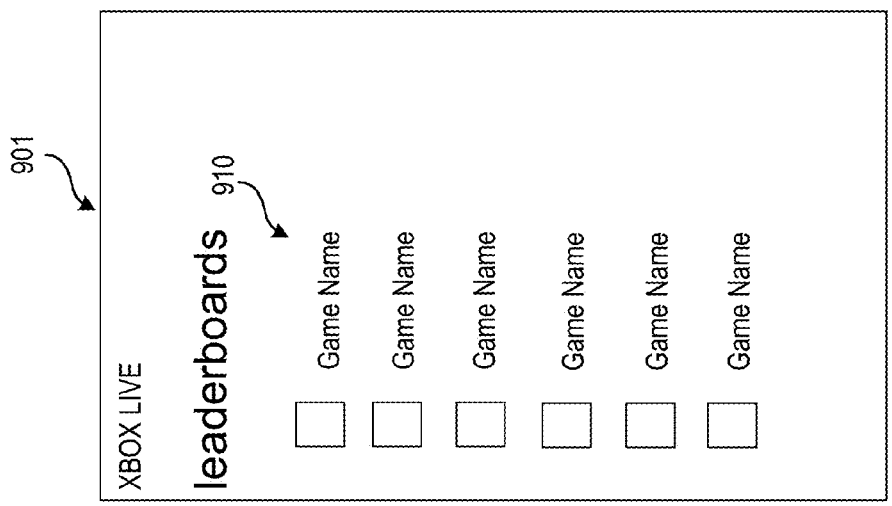

FIGS. 9A-9C show exemplary user interfaces 901-903 that can be displayed at a computing device for navigating to a particular leaderboard and to show the relative rankings of challenge participants. User interface 901 shows a list of games 910 for which a particular gaming service (e.g., Xbox LIVE®) maintains at least one leaderboard. Selecting a particular game within the list 910 causes the user interface 902 to be presented, which comprises a list 920 of leaderboards that the gaming service maintains for the selected game. Selection of a particular leaderboard within the list 920 causes the user interface 903 to be presented at the computing device output in which the relative rankings for users are displayed. The display 903 comprises the name of the gaming application, the leaderboard name, and a podium image 930 showing avatars and userids of the three users atop the selected leaderboard. The users shown in the podium graphic can be top three users atop the leaderboard (regardless of whether they are challenge participants), or the top three ranked challenge participants in the leaderboard. Challenge participant rankings can be shown in other forms, such as in a list.

Figure 10:
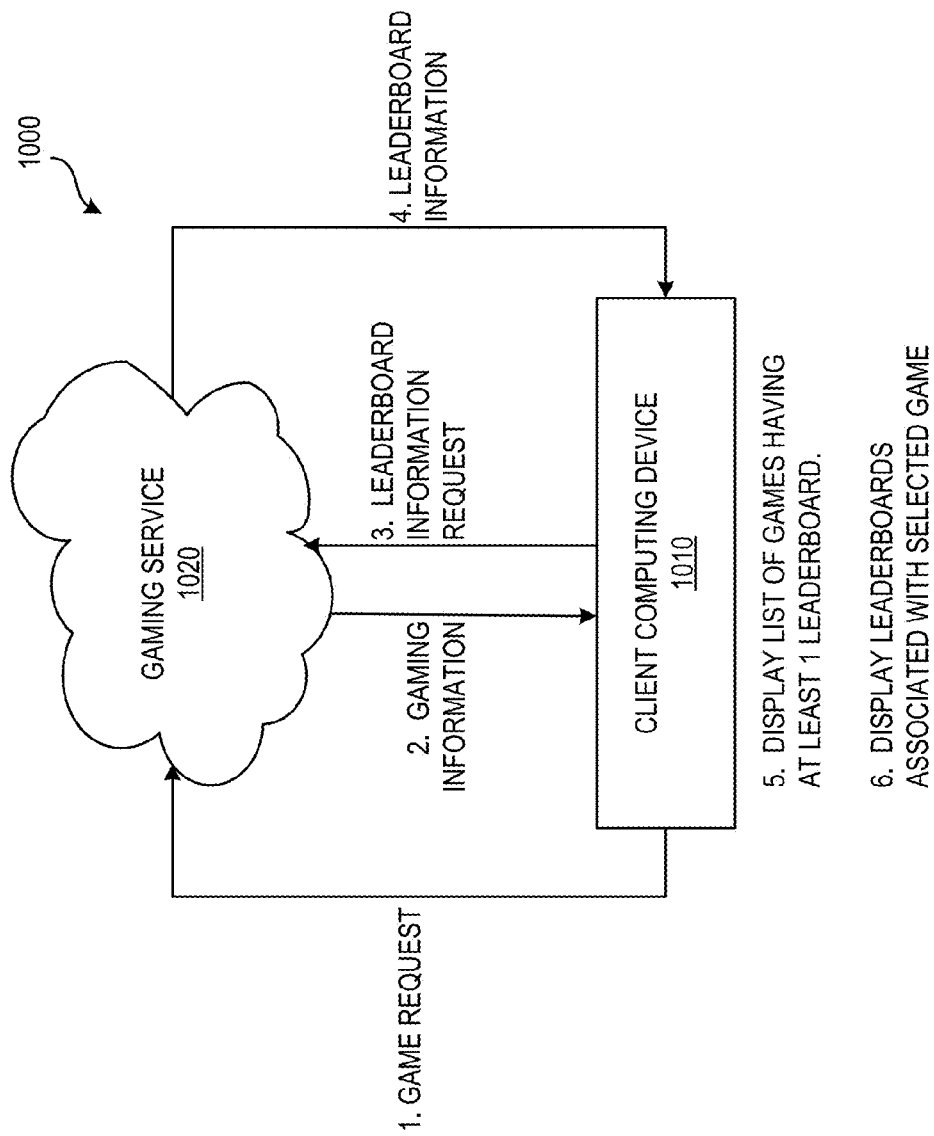
FIG. 10 shows a first exemplary flow of information between a client computing device and a gaming service.

FIG. 10 shows a first exemplary flow of information 1000 between a client computing device 1010 and a cloud-based gaming service 1020. The information received by the client computing device 1010 can be used to generate the exemplary user interfaces 901-903. First, the client computing device 1010 requests a list of games for which the gaming service 1020 manages at least one leaderboard. In some embodiments, the device 1010 can request the last n games that a user has played. Second, the gaming service 1020 returns gaming information. Third, the client computing device 1010 requests leaderboards for the games identified in the gaming information. Fourth, the gaming service 1020 returns leaderboard information for leaderboards associated with the games. The returned leaderboard information for a leaderboard can comprise a leaderboard identifier that uniquely identifies the leaderboard within the gaming service 1020 and a leaderboard friendly name (e.g., "Warrior World—Top Scores"). Fifth, the gaming information can be used to generate a list of games having at least one leaderboard supported by a gaming service, such as the list 910 in user interface 901. Games that do not have at least one leaderboard can be left out of the list 910. Sixth, after a game is selected by a user, the leaderboard information can be used to generate a list of the leaderboards associated with the selected game, such as the list 920 in the user interface 902.

FIG. 11 shows exemplary leaderboard information 1100 that can be transmitted from the gaming service 1020 to the client computing device 1010. The exemplary leaderboard information 1100 comprises a "leaderboards" data structure comprising data for leaderboards 1110, 1120 and 1130. For an individual leaderboard, the data structure comprises an "lbid" leaderboard id field that uniquely identifies the leaderboard to the gaming service, a "name" field that includes a leaderboard language and a leaderboard friendly name, and a "rating" field that includes a leaderboard language and a rating type indicating how leaderboard information is to be interpreted and displayed. For example, the "TimeColumn" rating type for leaderboards 1120 and 1130 can indicate that leaderboard data for these leaderboards are to be interpreted as a time and that the leaderboard is to be displayed in columns. The leaderboard information 1100 further includes a "primaryid" field that indicates which leaderboard is to be displayed as a default leaderboard, and a "titleid" that uniquely identifies the game associated with the leaderboards within a gaming service.

Figure 12:
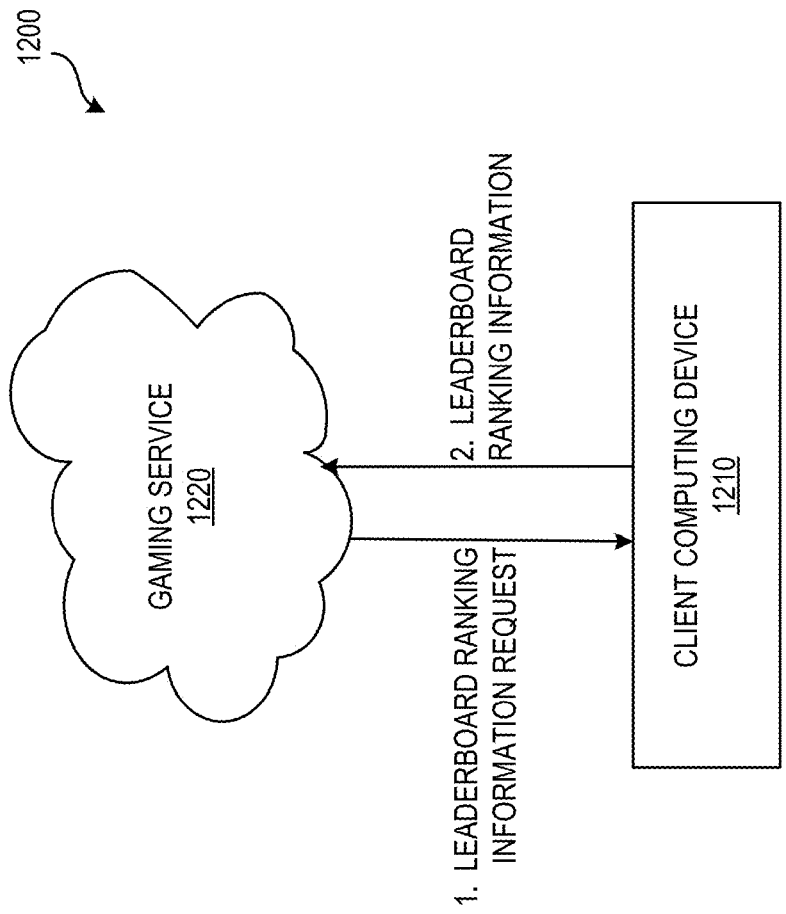
FIG. 12 shows a second exemplary flow of information between a client computing device and a gaming service.

FIG. 12 shows a second exemplary flow of information 1200 between a client computing device 1210 and a gaming service 1220. The information received by the client computing device 1210 can be used to generate the exemplary leaderboard display 903. First, the client computing device 1210 requests ranking information for a particular leaderboard. Second, the gaming service returns the requested leaderboard ranking information.

FIG. 13 shows exemplary leaderboard ranking information 1300 that can be transmitted from the gaming service 1220 to the client computing device 1210. The exemplary leaderboard information 1300 comprises a "lbname" leaderboard name field, a "pagingInfo" field that indicates, if the leaderboard comprises multiple pages, the leaderboard page being sent ("continuationToken") and the maximum number of pages ("totalItems"); a "rating" field indicating how the leaderboard is being rated (e.g., by duration), and a "userList" data structure comprising information for various users ranked in the leaderboard. The "userList" data structure comprises a "gamertag" field containing a user's userid or tag within the gaming service (e.g., "CriticalSTRo77"), a "rank" field indicating a user's rank within the leaderboard, a "rating" field indicating the game metric by which users are ranked in the leaderboard (in this example, time), and a "xuid" user identification field that uniquely identifies a user within the gaming service.

Once a challenge has begun, the technologies described herein can monitor progress of active gaming challenges. Returning to FIG. 3, after the computing device 310 or 330 has received leaderboard ranking information 370, the device 310 or 330 can determine whether a challenge participant's ranking has changed relative to any of the other challenge participants, based on the current value of the player's game metric being monitored by the leaderboard. For example, if computing device 310 is used by user A, who has challenged other users to a gaming challenge that utilizes the high score leaderboard for Game X, and leaderboard ranking information received from the gaming service 320 indicates that user A is currently second in the challenge, the computing device 310 may determine that user A's current score would currently place him first. In response, the computing device 310 can issue a challenge rank change notification 380 to the gaming service 320 to be passed to other participants to the challenge. The challenge rank change notification 380 can comprise user identification information for the other challenge participants and user A's current score for Game X. The gaming service 320 can update the Game X high score leaderboard with user A's current high score and issue a challenge rank change notification 380 to computing devices 330 of other challengees.

Upon receipt of a challenge rank change notification, a computing device can display a notification at the display of the computing device notifying the user of the rank change. A user can personalize a computing device's challenge settings so that the user is notified of all challenge rank changes, or only particular rank changes, such as when only the user of the computing device's relative ranking has changed, when the top position has changed, when any of the top n positions have changed, or when there is a rank change within the last minute, hour or other time prior to expiration of the challenge.

Figure 14:
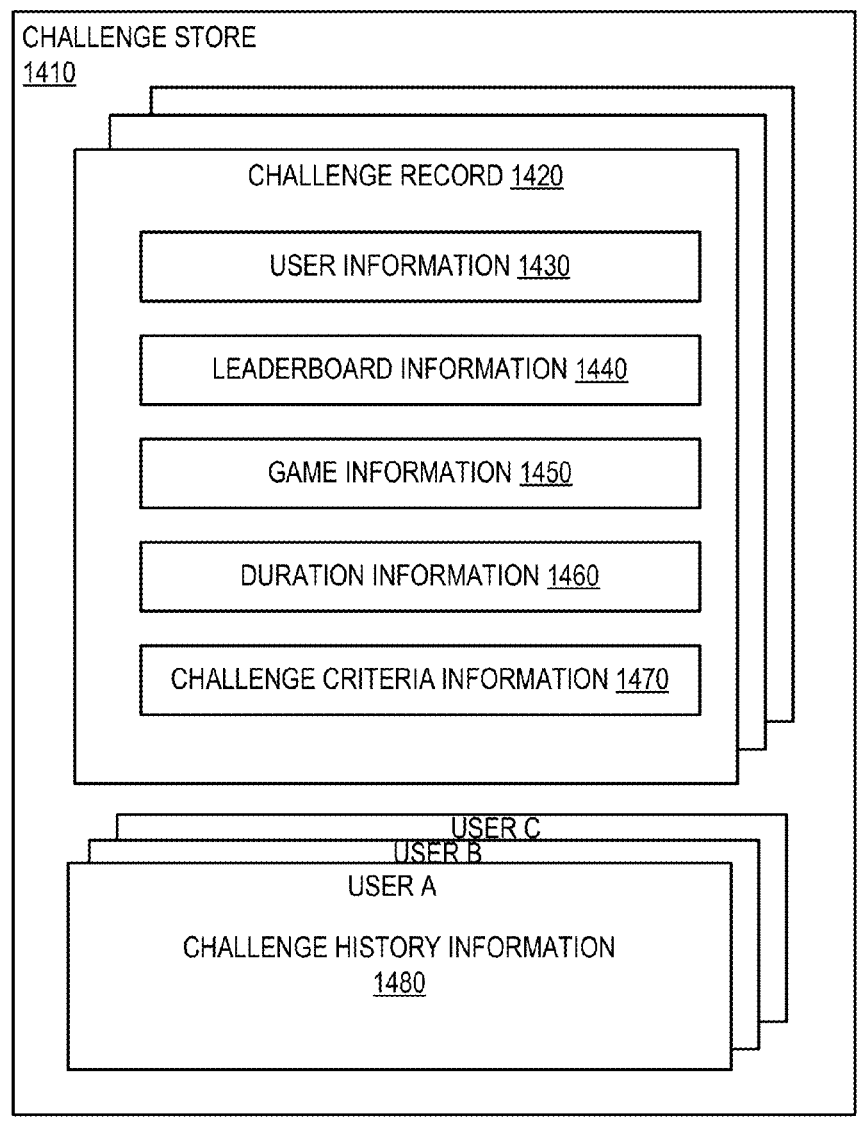
FIG. 14 shows an exemplary challenge store that can be stored at a computing device.

In some embodiments, a computing device can store challenge information locally. FIG. 14 shows an exemplary challenge store 1410 that can be stored at a computing device. In some embodiments, the challenge store 1410 is stored externally to a computing device, such as at an attached memory storage device or a memory accessible over a network (e.g., at a cloud-based service such as a gaming service). The challenge store 1410 comprises one or more challenge records 1420. A challenge record 1420 can comprises one or more of the following: participant information 1430 indicating identifying information for challenge participants (e.g., userids within a gaming service), leaderboard information 1440 identifying the leaderboard to be used in a challenge, game information 1450 identifying the gaming application to be played in the challenge, duration information 1460 indicating the duration of the challenge, and challenge criteria information 1470 containing additional information about the gaming challenge such as a challenge award; and/or particular course, level or difficulty level within the gaming application. Additional information that can be stored in a challenge record 1420 includes whether the challenge is an active or past (i.e., completed) challenge.

The challenge store 1400 can further comprise challenge history information 1480 for one or more other users. Challenge history information 1480 can comprise information indicating how the user of the computing device storing the challenge store 1410 has fared against other users in prior challenges, such as a current win or loss streak against the another user, information about the outcome of challenges involving other users such whether the user finished ahead of the other user in prior challenges, etc.

Upon receipt of a challenge rank change notification, a computing device can compare the information in the ranking change notification against the associated local challenge record before displaying a challenge rank change notification, thus avoid notifying a user of a particular rank change more than once. For example, in a challenge comprising three users, two computing devices can issue a challenge rank change notification to challenge participants indicating that user B has passed user C. The third computing device, upon receiving the first challenge rank change notification, updates the challenge record to reflect that user B is now ahead of user C, and displays a notice informing the user of this rank change. Upon receiving the second challenge rank change notification containing the same information, that user B has passed user C, the third computing device determines that this information is consistent with the challenge information stored locally, and does not present a change rank notice.

Figure 15A:
FIG. 15 shows exemplary user interfaces that display a leaderboard of a current challenge.
Figure 15B:
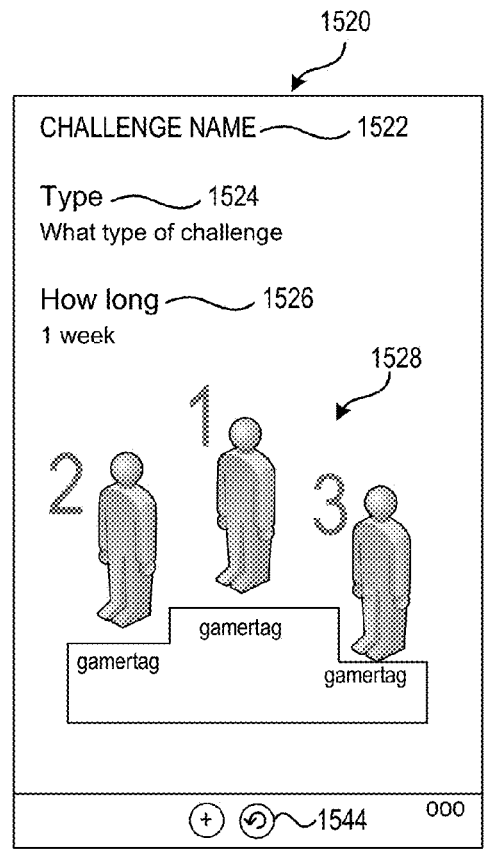

FIGS. 15A and 15B show exemplary user interfaces 1510 and 1520 that display a leaderboard of a current challenge. Navigating to a challenge component of a computing device operating system can cause a user interface 1510 to be output at a computing display. The user interface 1510 comprises a list of current challenges 1512. Selecting one of the current challenges can cause the user interface 1520 to be output at the device. The display 1520 can comprise information about the selected active challenge such as the challenge name 1522, the challenge type 1524, the challenge duration 1526 and information indicating the rankings of participants to the challenge. The user interface 1520 comprises a podium view 1528 of the three challenge participants that are currently leading the challenge. The podium view 1528 comprises the participants' avatars and userids. The rankings of the challenge participants can be displayed in various other manners (e.g., a list) and more or fewer than three participants can be shown in the ranked display. The user interface 1520 comprises a refresh button 1544 that causes the leaderboard to be refreshed. Refreshing the leaderboard can cause the computing device to transmit and leaderboard ranking information request to the gaming service and receive leaderboard ranking information in response, which is then used to present an updated leaderboard view.

In addition to being able to see a ranked view of the top ranked participants in a challenge, challenge participants can access a participants' view that displays user information for other participants to the challenge. The participants view can include, for example, a list of all users that were invited to participate in the challenge, or only the users that accepted the challenge. If participants that declined the challenge invitation are listed, they can be listed in order by, for example, the time when the invitation was declined. Additionally, a user element indicator (e.g., a graphic element) can be shown next to users that declined the challenge invitation indicating that they declined the challenge.

The technologies disclosed herein are also capable of determining when a challenge has ended. A challenge can end for various reasons, such as when the challenge has been met by one of the challenge participants (e.g., a user has reached a specified score, beat a specified time, finished a specified challenge, obtained a specified item or specified number of specified items) or that the challenge has expired. Upon expiration of a time-based relative challenge, the challenging computing device can determine the challenge winner based on which participant has the highest leaderboard ranking upon expiration of the challenge. An objective-based challenge can have no winner if no participant has reached a specified goal when the challenge expires.

A computing device can check to see whether challenge criteria has been met when, for example, the gaming application sends a user's gaming metric to a gaming service to update a leaderboard. Alternatively, gaming applications can be configured to pass information to a challenge component of the computing device operating system whenever a user finishes a race, quest, mission or objective. When a computing device determines that a challenge has ended, the computing device can send a challenge end notification to the other challenge participants. Returning to FIG. 3, if, for example, in a gaming challenge where the first user to finish a course under two minutes wins the challenge, and the challengee operating computing device 330 finishes the designated course in 1:53, the computing device 330 sends a challenge end notification 390 to the gaming service 320. The gaming service 320 relays the challenge end notification 390 to the challenger computing device 310 and other challengee computing devices 330.

Upon the completion of a challenge, a computing device can update the corresponding challenge record in its challenge store to indicate that the challenge is no longer active. In addition, the computing device can transmit a final leaderboard information request to the gaming service to receive final leaderboard ranking information. The challenge record for the completed challenge can be updated based on the final ranking information and the challenge history information for challenge participants can be updated based on the results of the completed challenge as well.

FIG. 16 shows exemplary user interfaces 1601-1603 for managing challenges. User interface 1601 shows a list of active challenges 1610 and a list of past challenges 1612. The active challenges can be challenges that have not yet been accepted by the user, or challenges that have been accepted and are in progress. The user interface 1602 shows lists of active and past challenges with checkboxes 1620 that can be selected by a user to mark challenges for deletion. Display 1602 shows the second and fourth active challenges selected for deletion. A user can delete the marked challenges by selecting the trash can button 1622. The user interface 1603 shows an updated active challenge list 1630 after the trash can button 1622 has been selected. In some embodiments, challenges that a user has not accepted or declined can remain stored at a computing device for a default period of time (e.g., 1 week, 1 month) after which it is deleted. A user can withdraw from a challenge that the user has previously accepted by deleting the on-going challenge.

Figure 18:
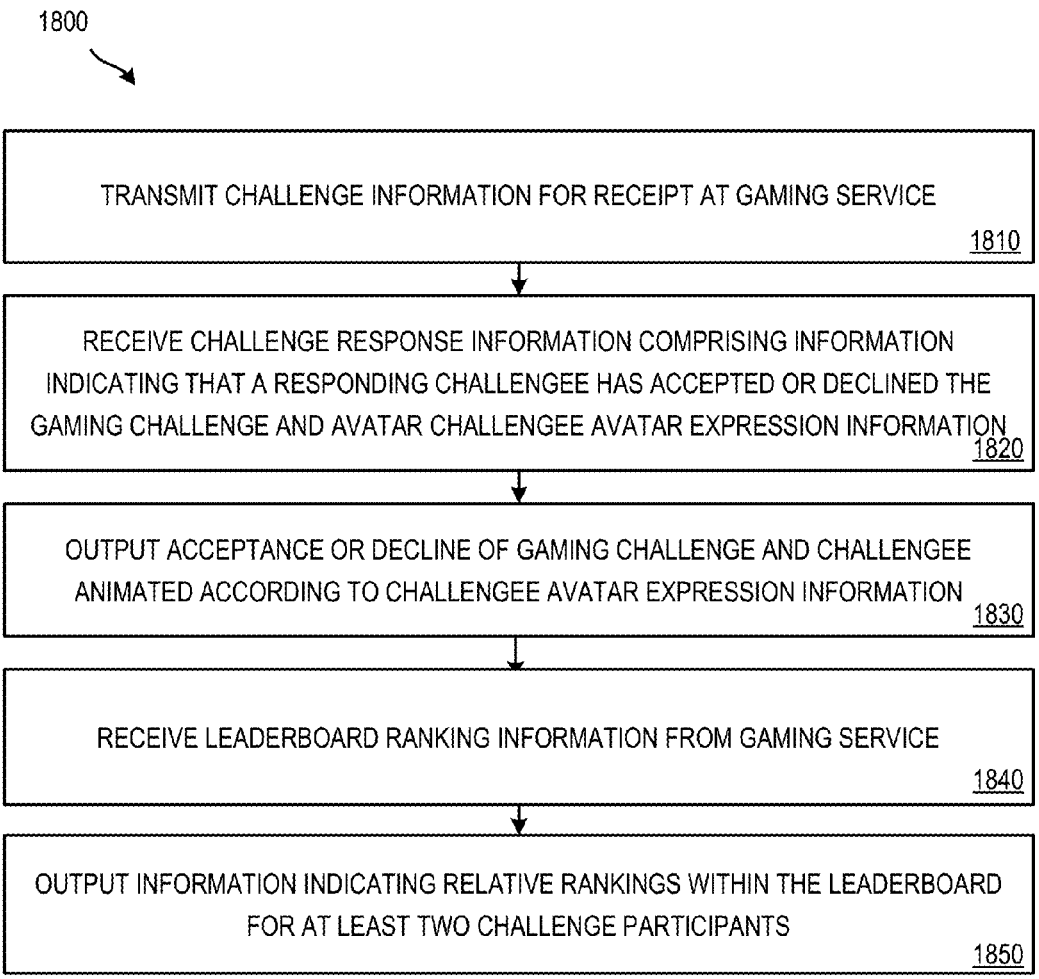
FIG. 18 is a flowchart of an exemplary method of issuing a gaming challenge.

FIG. 18 is a flowchart of an exemplary method 1800 of issuing a gaming challenge. The exemplary method 1800 can be performed by, for example, a smartphone operated by user A and capable of communicating with the Xbox LIVE® service. At 1810, at a client computing device, challenge information is transmitted for receipt at a gaming service. The challenge information comprises participant information identifying a plurality of challenge participants, the challenge participants comprising a challenger and one or more challengees; game information identifying a gaming application to be played as part of the gaming challenge; and leaderboard information identifying a leaderboard associated with the gaming application, the leaderboard ranking users according to a game metric associated with the gaming application. In the example, the smartphone transmits challenge information to the Xbox LIVE® service. The challenge information comprises information indicating that user A, the challenger, and user B, the challengee, are participants to the challenge; that the game Racer X is the gaming application that is to be played as part of the gaming challenge, and that the leaderboard titled "Racer X—Fastest Lap—Couse 1" is the leaderboard to be used in determining the winner of the challenge.

At 1820, challenge response information is received comprising information indicating that a responding challengee has been accepted or declined the gaming challenge and challengee avatar expression information. In the example, the smartphone receives challenge response information comprising information indicating that user B has accepted the challenge and user B avatar expression information indicating that user B's avatar is to be expressed as confident when the acceptance is output at the display of user A's smartphone. At 1830, a user interface is output at the client computing device comprising information indicating that the responding challengee has accepted or declined the gaming challenge and a responding challengee avatar animated according to the challengee avatar expression information. In the example, a user interface showing user B's acceptance of the challenge is displayed at the smartphone, along with an avatar of user B animated as being boastful.

At 1840, leaderboard ranking information is received from the gaming service indicating a rank within the leaderboard for at least two of the challenge participants. In the example, leaderboard ranking information is received from the Xbox LIVE® service indicating that users A and B are ranked fourth and tenth, respectively, in the "Racer X—Fastest Lap—Course 1" leaderboard. At 1850, information is output at a display of the client computing device indicating relative rankings within the leaderboard for the at least two challenge participants. In the example, a podium image is displayed at the smartphone display showing user A ranked first and user B ranked second.

The method 1800 can comprise more or fewer process blocks than those shown in FIG. 18. For example, the method 1800 can exclude process blocks 1820, 1830, 1840 and 1850, or exclude process blocks 1840 and 1850. In other embodiments, the method 1800 can comprise additional actions performed by a client computing device participating in a challenge, as described herein.

Figure 19:
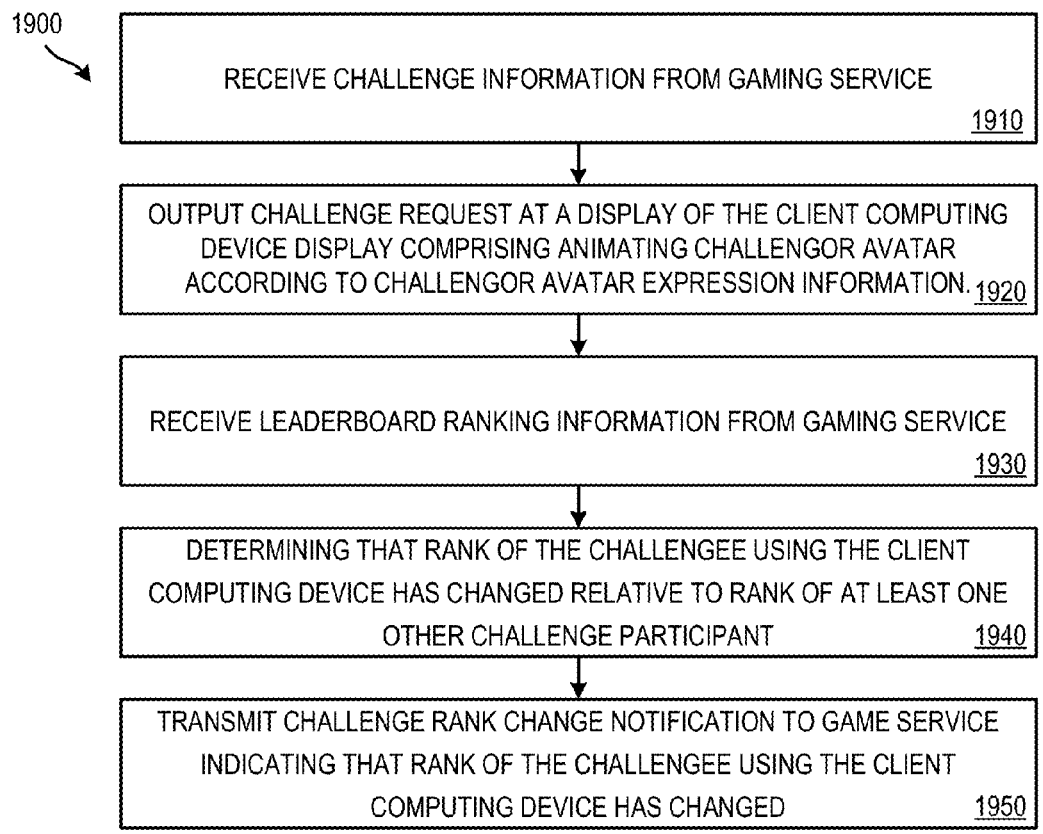
FIG. 19 is a flowchart of an exemplary method of accepting a gaming challenge.

FIG. 19 is a flowchart of an exemplary method 1900 of accepting a gaming challenge. The method 1900 can be performed by, for example, a smartphone operated by user C and capable of communicating with a gaming service. At 1910, challenge information is received at a client computing device from a gaming service. The challenge information comprises: participant information identifying a challenger and one or more challengees; game information identifying a gaming application to be played as part of the gaming challenge; leaderboard information identifying a leaderboard associated with the gaming application, the leaderboard ranking users according to a game metric associated with the gaming application; and challenger avatar expression information. In the example, the smartphone receives challenge information comprising participant information identifying user A as the challenger and users B and C as challengees, game information identifying "Universe of Monsters" as the gaming application to be played, leaderboard information identifying "Universe of Monsters—Player Level" as the leaderboard to be used in determining whether the challenge has been met, and challenger avatar expression information indicating that the user A's avatar is to be expressed as "arrogant" when a challenge request is presented to the user C.

At 1920, a challenge request is output at a display of the client computing device. The output comprises animating a challenger avatar according to the challenger avatar expression information. In the example, a challenge request is output at the smartphone display comprising user A's avatar animated as being arrogant.

At 1930, leaderboard ranking information is received from the gaming service indicating a rank within the leaderboard for at least two of the challenge participants. In the example, the smartphone receives leaderboard ranking information indicating the users A, B and C are ranked $40^{th}$, $200^{th}$ and $105^{th}$ in the "Universe of Monsters—Player Level" leaderboard.

At 1940, it is determined that a rank of the challengee using the client computing device within the leaderboard has changed relative to the rank of at least one of the other challenge participants. In the example, the smartphone determines that user C has fallen behind user B in the leaderboard ranking. This can be based on a challenge record stored at the smartphone that indicated that user C was previously ranked $350^{th}$. At 1950, a challenge rank change notification is transmitted to the gaming service indicating that the rank of the challengee using the client computing device has changed relative to the rank of at least one of the other challenge participants. In the example, the smartphone transmits a challenge rank change notification to the gaming service indicating that user C has passed user B in the "Universe of Monsters—Player level" leaderboard.

The method 1900 can comprise more or fewer process blocks than those shown in FIG. 19. For example, the method 1900 can exclude of process block 1920, 1930, 1940 and 1950, or exclude process blocks 1940 and 1950. In other embodiments, the method 1900 can comprise additional actions performed by a client computing device participating in a challenge, as described herein.

The disclosed technologies have at least the following exemplary advantages. The challenge technologies can turn single-player gaming applications into multi-player gaming applications without requiring modifications to the single-player gaming applications. As used herein, the term "single-player" game includes multi-player games that have a single-player mode. While participating in a challenge, a user can play a single-player gaming application just as if he or she were not participating in a challenge. The challenge features of a computing device operating system can manage challenge-related operations at the computing device, such as creating a challenge; generation, transmitting, receiving and processing of challenge notifications (e.g., challenge rank change notifications, challenge end notifications); determining when a challenge has expired (by determining that challenge criteria have been satisfied or a challenge has expired); managing a challenge store; requesting leaderboard ranking information and the like. The gaming challenges disclosed herein are not limited to single-player gaming applications and can involve the playing of multi-player gaming applications.

In some embodiments, the challenge features of a computing device operating system can be configured to interact with gaming applications that have been modified to support challenges. For example, a particular gaming application can be informed by the operating system of active challenges involving the gaming application and various challenge criteria that needs to be satisfied in order for the challenge to be met, and the application can inform the operating system when a specified objective has been obtained (e.g., a level completed, an object acquired, an opponent defeated), a specified objective time on a particular course has been bested, or other challenge criteria satisfied.

Gaming applications can be configured to support challenges in other ways. For example, in a time-based challenge in a racing game application where a user can race against opponents controlled by the application, one or more "pacing" opponents can be generated that finish the course at a time specified in the challenge as the time to beat in order to win the challenge, or the best time for other challenge participants. The pacing opponent can be distinguished from other application-controlled opponents by a specific color, marking, symbol or graphic image that tracks the pacing opponent so that the user which opponent he or she needs to beat in order to win the challenge (or move up in the rankings). The pace of the pacing opponent can change during the challenge as the time of the top-ranked participant improves, or the time of other challenge participants improves. In objective-based challenges, the application can provide a notification or indicate that a particular level, mission, quest, task, object or opponent is to be obtained, completed or finished in order to meet a challenge. This can be done by, for example, highlighting a mission, task or level or adding the word "challenge" (or an equivalent) in a list when the user is selecting a portion of the game to play, or giving an object or an opponent a special or different color or marking.

In addition, by utilizing a leaderboard managed by a gaming service in determining whether a challenge is met, the challenge technologies can have the advantage of leveraging existing gaming service infrastructure. The leaderboard ranking information requests transmitted to a gaming service by a computing device can follow existing leaderboard ranking information request formats so that no modifications to the gaming service are required. In addition, a gaming service's in-service messaging system can be utilized to pass challenge-based messages and notifications between challenge participants. As discussed herein, a gaming service can be configured to support challenge features. For example, a gaming service can be modified to support custom leaderboards for individual challenges or to support various aspects of tournament challenges as described herein.

In one exemplary embodiment of a method of issuing a gaming challenge, the method comprises: at a client computing device, transmitting challenge information for receipt at a gaming service, the challenge information comprising: participant information identifying a plurality of challenge participants, the challenge participants comprising a challenger and one or more challengees; game information identifying a gaming application to be played as part of the gaming challenge; and challenge criteria information indicating one or more challenge criteria that are to be satisfied for the gaming challenge to have been met by a challenge participant.

Any of the disclosed methods can be implemented as computer-executable instructions or a computer program product. Such instructions can cause a computer to perform any of the disclosed methods. The computer-executable instructions or computer program products as well as any data created and used during implementation of the disclosed embodiments can be stored on one or more computer-readable storage media (e.g., non-transitory computer-readable storage media, such as one or more optical media discs (such as DVDs or CDs), volatile memory components (such as DRAM or SRAM), or nonvolatile memory components (such as flash memory or hard drives)) and executed on a computer (e.g., any commercially available computer, including smart phones or other computing devices that include computing hardware). Computer-readable storage media does not include propagated signals. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are known in the art are omitted. For example, it is to be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

Any of the methods described herein can be implemented by computer-executable instructions stored in one or more computer-readable storage devices (e.g., hard disk drives, floppy disk drives, memory integrated circuits, memory modules, solid-state drives and other devices comprising computer-readable storage media). Such instructions can cause a computer to perform the methods described herein.

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Having illustrated and described the principles of the illustrated embodiments, the embodiments can be modified in various arrangements while remaining faithful to the concepts described above. In view of the many possible embodiments to which the principles of the illustrated embodiments may be applied, it should be recognized that the illustrated embodiments are only examples and should not be taken as limiting the scope of the disclosure. We claim all that comes within the scope of the appended claims.

The invention claimed is:

1. A method of issuing a gaming challenge comprising:
at a client computing device using one or more processors:
transmitting challenge information for receipt at a gaming service, the challenge information comprising:
participant information identifying a plurality of challenge participants, the challenge participants comprising a challenger and one or more challengees, the one or more challengees selected by the challenger;
game information identifying a gaming application to be played as part of the gaming challenge, the gaming application selected by the challenger from a plurality of gaming applications; and
leaderboard information identifying a leaderboard associated with the gaming application, the leaderboard ranking at least the challenger and the one or more challengees according to a game metric associated with the gaming application;

receiving, from the gaming service, leaderboard ranking information associated with the identified leaderboard for at least two of the challenge participants within the leaderboard;

based on the leaderboard ranking information and the game metric for the challenger at completion of play of the gaming application, determining that a rank of the challenger has changed relative to a rank of at least one of the challengees within the leaderboard; and responsive to the determining that the rank of the challenger has changed, transmitting a challenge rank change notification, to the gaming service, to update the leaderboard at the gaming service, the challenge rank change notification indicating that the rank of the challenger has changed relative to the rank of at least one of the challengees, so that the challenge rank change notification passes only in a direction from the client computing device to the gaming service.

2. The method of claim 1, wherein the challenge information further comprises challenger avatar expression information indicating how a challenger avatar is to be animated when the challenger avatar is displayed as part of a challenge request at a display of a computing device operated by a challengee.

3. The method of claim 1, wherein the gaming application is played as a single-player game.

4. The method of claim 1, wherein the challenge information further comprises a challenge message, the method further comprising prompting the challenger for the challenge message, the prompting comprising presenting a user interface at a display of the client computing device, the user interface comprising a challenge message window pre-populated with a pre-populated challenge message based on a challenge history between the challenger and at least one of the one or more challengees.

5. The method of claim 1, wherein the challenge information further comprises challenge type information indicating a challenge type, duration information indicating a duration for the challenge, and challenge criteria information indicating one or more criteria to be satisfied in order for the gaming challenge to be met.

6. The method of claim 5, wherein the challenge type is a tournament challenge type for which the gaming challenge comprises a plurality of challenges between pairs of the challenge participants.

7. The method of claim 1, wherein the challenge information further comprises award information indicating an avatar awardable to be awarded to a winner of the gaming challenge.

8. The method of claim 1, further comprising:
outputting at a display of the client computing device information indicating relative rankings within the leaderboard for the at least two challenge participants, wherein the relative rankings comprise a position of one of the challenge participants relative to other challenge participants within the leaderboard.

9. The method of claim 1, further comprising:
receiving challenge response information comprising information indicating that a responding challengee has accepted or declined the gaming challenge, and responding challengee avatar expression information; and
outputting at a display of the client computing device information indicating that the responding challengee has accepted or declined the gaming challenge, and a responding challengee avatar animated according to the responding challengee avatar expression information.

10. One or more non-volatile computer-readable storage media storing computer-executable instructions, which when executed by a client computing device, cause the client computing device to perform a method of accepting a gaming challenge by a challengee, the method comprising:
at the client computing device of the challengee:
receiving, from a gaming service, challenge information, the challenge information comprising:
participant information identifying a challenger, the challenger having selected the challengee for the gaming challenge;
game information identifying a gaming application to be played as part of the gaming challenge, the gaming application selected by the challenger from a plurality of gaming applications; and
leaderboard information identifying a leaderboard associated with the gaming application, the leaderboard ranking at least the challenger and the challengee according to a game metric associated with the gaming application;
receiving, from the gaming service, leaderboard ranking information for challenge participants, the challenge participants comprising the challenger and the challengee;
based on the leaderboard ranking information and the game metric for the challengee at completion of play of the gaming application, determining that a rank of the challengee within the leaderboard has changed relative to a rank of at least one of the other challenge participants; and
responsive to the determining that the rank of the challengee has changed, transmitting a challenge rank change notification, to the gaming service, to update the leaderboard at the gaming service with the current game metric for the challengee, the challenge rank change notification indicating that the rank of the challengee has changed relative to the rank of at least one of the other challenge participants, the challenge rank change notification passing only in a direction from the client computing device to the gaming service.

11. The one or more non-volatile computer-readable storage media of claim 10, wherein the challenge information further comprises challenger avatar expression information, the method further comprising outputting a challenge request at a display of the client computing device, the outputting comprising animating a challenger avatar according to the challenger avatar expression information.

12. The one or more non-volatile computer-readable storage media of claim 10, wherein the challenge information further comprises challenger avatar expression information, the method further comprising:
outputting a notification at the display of the client computing device that the gaming challenge has been issued; and
in response to selection of the notification, outputting an interstitial page at the client computing device comprising a challenger avatar animated according to the challenger avatar expression information.

13. The one or more non-volatile computer-readable storage media of claim 10, wherein the method further comprises transmitting challenge response information to the gaming service, the challenge response information comprising information indicating whether the challengee has accepted or declined the gaming challenge, and challengee avatar expression information.

14. The one or more non-volatile computer-readable storage media of claim 10, wherein the method further comprises maintaining at the client computing device a challenge record for the gaming challenging, the challenge record comprising local ranking information indicating the rank of at least two of the challenge participants within the leaderboard, wherein the determining that the rank of the challengee has changed comprises comparing the leaderboard ranking information to the local ranking information.

15. The one or more non-volatile computer-readable storage media of claim 10, wherein the method further comprises:
receiving challenge rank change information from the gaming service indicating that a rank of the challengee using the client computing device within the leaderboard has changed relative to a rank of at least one other challenge participant; and
outputting a challenge rank change notification at a display of the client computing device indicating that the rank of the challengee using the client computing device has changed relative to the rank of at least one other challenge participant.

16. The one or more non-volatile computer-readable storage media of claim 10, wherein the challenge information comprises challenge criteria information indicating one or more criteria to be satisfied in order for the gaming challenge to be met, the method further comprising:
determining that the challengee using the client computing device has satisfied the challenge criteria; and
transmitting a challenge complete notification to the gaming service indicating that the challengee using the client computing device has met the gaming challenge.

17. A client computing device comprising at least one processor and memory, the memory storing computer-executable instructions for causing the client computing device to perform a method of issuing a gaming challenge, the method comprising:
at the client computing device:
transmitting challenge information for receipt at a gaming service, the challenge information comprising:
participant information identifying a plurality of challenge participants, the challenge participants comprising a challenger and one or more challengees, the one or more challengees selected by the challenger;
game information identifying a gaming application to be played as part of the gaming challenge, the gaming application selected by the challenger from a plurality of gaming applications;
challenge criteria information identifying one or more challenge criteria to be satisfied in order for the gaming challenge to be met;
challenge duration information indicating a duration of the gaming challenge; and
leaderboard information identifying a leaderboard associated with the gaming application to be used in determining whether the gaming challenge has been met, the leaderboard ranking at least the challenger and the one or more challengees according to a game metric associated with the gaming application;
receiving, from the gaming service, leaderboard ranking information associated with the identified leaderboard indicating a rank within the leaderboard for at least two of the challenge participants;
outputting, at a display of the client computing device, information indicating relative rankings within the leaderboard for the at least two challenge participants, wherein the relative rankings comprise a position of one of the challenge participants relative to other challenge participants within the leaderboard;
based on the leaderboard ranking information and the game metric for the challenger at completion of play of the gaming application, determining that a rank of the challenger has changed relative to a rank of at least one of the challengees within the leaderboard; and
responsive to the determining that the rank of the challenger has changed, transmitting a challenge rank change notification, to the gaming service, to update the leaderboard at the gaming service with the game metric for the challenger, the challenge rank change notification indicating that the rank of the challenger has changed relative to the rank of at least one of the challengees, the challenge rank change notification passing only in a direction from the client computing device to the gaming service;
receiving challenge rank change information, from the gaming service, indicating that the rank of a challenger within the leaderboard has changed relative to the rank of at least one of the challengees;
outputting, at the display of the client computing device, a challenge rank change notification indicating that the rank of the challenger has changed relative to the rank of at least one of the challengees;
determining that the challenge has been completed due to the challenger satisfying the challenge criteria or the challenge duration having expired; and
transmitting a challenge complete notification to the gaming service.

* * * * *